(12) United States Patent
Nunnink et al.

(10) Patent No.: US 10,944,891 B2
(45) Date of Patent: *Mar. 9, 2021

(54) SYMBOLOGY READER WITH MULTI-CORE PROCESSOR

(71) Applicant: Cognex Corporation, Natick, MA (US)

(72) Inventors: Laurens Nunnink, Simpleveld (NL); Richard Reuter, Wuerselen (DE); Frank Winzen, Aachen (DE); Mario Joussen, Nideggen (DE); Joerg Kesten, Merzenich (DE); James A. Negro, Arlington, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,570

(22) Filed: Dec. 10, 2018

(65) Prior Publication Data

US 2019/0379804 A1 Dec. 12, 2019

Related U.S. Application Data

(63) Continuation of application No. 13/645,173, filed on Oct. 4, 2012, now Pat. No. 10,154,177.

(51) Int. Cl.
*H04N 7/18* (2006.01)
*H04N 5/225* (2006.01)
*H04N 5/232* (2006.01)

(52) U.S. Cl.
CPC .............. *H04N 5/225* (2013.01); *H04N 5/232* (2013.01); *H04N 5/232121* (2018.08)

(58) Field of Classification Search
CPC .............................. H04N 5/225; H04N 5/232

USPC ........................................................ 348/135
See application file for complete search history.

(56) References Cited

U.S. PATENT DOCUMENTS

| 10,154,177 | B2 * | 12/2018 | Nunnink | H04N 5/232 |
| 2009/0278925 | A1 * | 11/2009 | Koval | H04N 5/2624 348/92 |
| 2013/0155220 | A1 * | 6/2013 | Mahuna | G01N 21/8851 348/86 |
| 2013/0181054 | A1 * | 7/2013 | Durham | G06Q 20/351 235/462.41 |

(Continued)

*Primary Examiner* — Shan E Elahi
(74) *Attorney, Agent, or Firm* — Loginov & Associates, PLLC; William A. Loginov

(57) ABSTRACT

A vision system camera, and associated methods of operation, having a multi-core processor, high-speed, high-resolution imager, FOVE, auto-focus lens and imager-connected pre-processor to pre-process image data provides the acquisition and processing speed, as well as the image resolution that are highly desirable in a wide range of applications. This arrangement effectively scans objects that require a wide field of view, vary in size and move relatively quickly with respect to the system field of view. This vision system provides a physical package with a wide variety of physical interconnections to support various options and control functions. The package effectively dissipates internally generated heat by arranging components to optimize heat transfer to the ambient environment and includes dissipating structure (e.g. fins) to facilitate such transfer. The system also enables a wide range of multi-core processes to optimize and load-balance both image processing and system operation (i.e. auto-regulation tasks).

17 Claims, 37 Drawing Sheets

(56) References Cited

U.S. PATENT DOCUMENTS

2013/0188065 A1\* 7/2013 Wegener ............ H04N 21/2381
348/207.99

\* cited by examiner

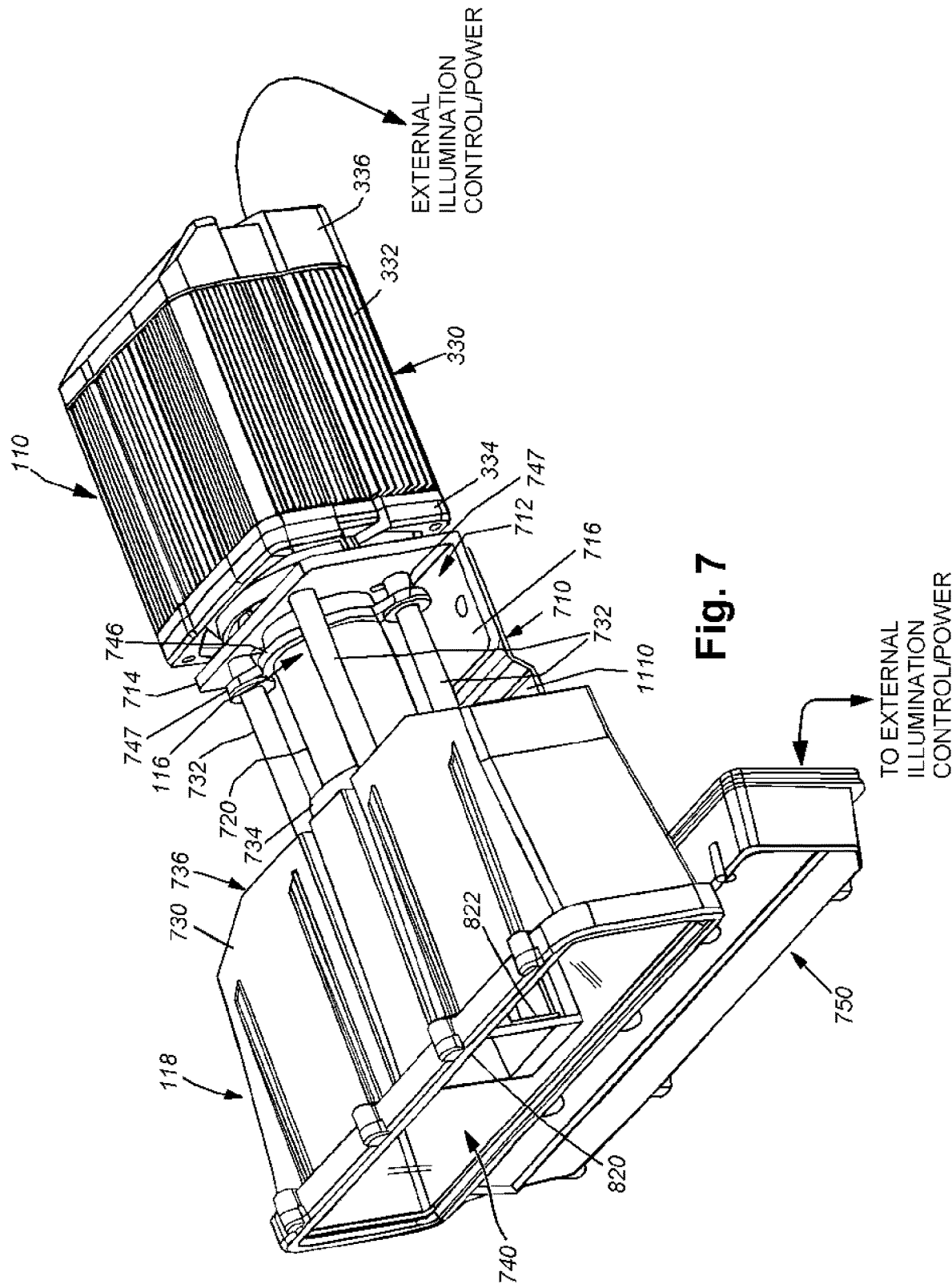

SYMBOLOGY READER WITH MULTI-CORE PROCESSOR

RELATED APPLICATIONS

This application is a continuation of co-pending U.S. patent application Ser. No. 13/645,173, titled SYMBOLOGY READER WITH MULTI-CORE PROCESSOR, filed Oct. 4, 2012, the teachings of which are expressly incorporated herein by reference. This application is related to commonly-assigned U.S. patent application Ser. No. 13/645,213, entitled SYSTEMS AND METHODS FOR OPERATING SYMBOLOGY READER WITH MULTI-CORE PROCESSOR, by Mario Joussen, et al, filed on Oct. 4, 2012, now U.S. Pat. No. 8,794,521, issued on Aug. 5, 2014, the teachings of which are expressly incorporated herein by reference.

FIELD OF THE INVENTION

This invention relates to machine vision systems, and more particularly to vision systems capable of acquiring, processing and decoding symbology, such as barcodes

BACKGROUND OF THE INVENTION

Vision systems that perform measurement, inspection, alignment of objects and/or decoding of symbology (e.g. one-dimensional and two-dimensional bar codes—also termed "IDs") are used in a wide range of applications and industries. These systems are based around the use of an image sensor (also termed an "imager"), which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes, 2D codes or other symbol types. The image is processed to identify code features, which are then decoded by a decoding process and/or processor obtain the inherent alphanumeric data represented by the code.

A common use for ID readers is to track and sort objects moving along a line (e.g. a conveyor) in manufacturing and logistics operations. The ID reader can be positioned over the line at an appropriate viewing angle to acquire any expected IDs on respective objects as they each move through the field of view. The focal distance of the reader with respect to the object can vary, depending on the placement of the reader relative to the moving line and the size (i.e. height) of the object. That is, larger objects may cause IDs thereon to be located closer to the reader, while smaller/flatter objects may contain IDs that are further from the reader. In each case, the ID should appear with sufficient resolution to be properly imaged and decoded. Disadvantageously, most commercially available image sensors, upon which vision system cameras are based, define a pixel array that is nearly square in dimension (e.g. nearly a 1:1 aspect ratio of width-to-height, and more typically a ratio of 4:3, 5:4 or 16:9). This width/height ratio does not fit well with the requirements of a reading application in which objects on a wide conveyor line pass with respect to the camera's field of view (FOV). More generally, height of the FOV should be slightly larger than the ID (or other region of interest), while the width of the FOV should be approximately equal or slightly greater than to that of the conveyor line. In some instances, a line-scan camera can be employed to address object movement and a wide filed of view. However, such solutions are not applicable for certain object geometries and line arrangements. Likewise, line scan (i.e. one-dimensional) image sensors tend to be more costly than conventional rectangular format sensors.

Where an object and/or the line is relatively wide, the lens and imager of a single ID reader may not have sufficient field of view in the widthwise direction to cover the entire width of the line while maintaining needed resolution for accurate imaging and decoding of IDs. Failure to image the full width can cause the reader to miss reading IDs that are outside of the field of view, or that pass through the field too quickly. A costly approach to provide the needed width is to ermploy multiple cameras across the width of the line, typically networked together to share image data and processes. A wider aspect ratio for the FOV of one or more cameras can alternatively be achieved by optically expanding the native FOV of the sensor using a field of view expander that splits the field into a plurality of narrower strips that stretch across the width of the conveyor line. A challenge in providing such an arrangement is that a narrower field in the upstream-to-downstream direction of the moving line may require a higher frame rate to ensure an ID is properly captured before it passes out of the field. This can tax the processing speed of the system and current imager-based decoding systems that acquire over a wide area basically lack the frame rate needed for reliable decoding at high object-throughput speed.

A further challenge in operating a vision-system-based ID reader is that focus and illumination should be set to relatively optimal values in order to provide a readable image of IDs to the decoding application. This entails rapid analysis of the focal distance and the lighting conditions so that these parameters can be automatically accounted for and/or automatically adjusted. Where fields of view are wide and/or the throughput of objects relative to the imaged scene is high, the processing speed needed to perform such functions may be unavailable using conventional vision-system based readers.

In general, imagers/sensors can acquire images at a relatively high frame rate to accommodate such high-speed functions. It is generally desirable to provide image processing arrangements/procedures that can more-effectively employ image frames in a variety of manners that enhance the ability of the system to adjust parameters and read image data at a higher rate of speed.

SUMMARY OF THE INVENTION

This invention overcomes disadvantages of the prior art by providing a vision system camera, and associated methods of operation, having a multi-core processor, high-speed, high-resolution imager, field of view expander (FOVE), auto-focus lens and imager-connected pre-processor to pre-process image data provides the acquisition and processing speed, as well as the image resolution that are highly desirable in a wide range of applications. This arrangement is highly effective in scanning objects that require a wide field of view, vary in size and the positioning of features of interest and move relatively quickly with respect to the system field of view. This vision system provides a physical package with a wide variety of physical interconnections to support various options and control functions. The package effectively dissipates internally generated heat by arranging components so as to optimize heat transfer to the ambient environment and includes dissipating structure (e.g. fins) to facilitate such transfer. The system also enables a wide range of multi-core processes to optimize and load-balance both image processing and system operation (i.e. auto-regulation tasks).

In an illustrative embodiment a vision system includes a camera housing enclosing an imager and processor arrangement. The processor arrangement includes (a) a pre-processor interconnected to the imager that receives, at a first frame rate (e.g. 200 to more than 300 images per second), and pre-processes images from the imager, and (b) a multi-core processor (with a plurality of cores) that receives pre-processed images from the pre-processor and performs vision system tasks thereon. This allows generation of results relative to information in the images. Note, as used herein, the term "core" shall be taken broadly to include a discrete "set of cores" that is assigned to a particular task. Illustratively, the first frame rate is significantly higher than a second frame rate at which the multi-core processor receives images from the pre-processor. The pre-processor (e.g. an FPGA, ASIC, DSP, etc.) can also be interconnected with a data memory that buffers predetermined of the images from the imager. In various processes parts of images or partial images can be buffered based upon direction of the pre-processor, where an entire image is unnecessary to a particular function (e.g. auto-regulation). Likewise, sub-sampled image data can be buffered in certain processes, such as auto-regulation where full-resolution images is unnecessary to carry out a task. In addition, the multi-core processor can be interconnected with a data memory that stores operating instructions for each core of the multi-core processor. This memory also stores image data for processing by each core based upon a schedule. In particular, the schedule directs that images are each selectively processed in each core so as to increase efficiency in generation of the results. The schedule can direct one or more core to perform, system tasks (also termed "system operation tasks"—not directly connected with image processing and decoding tasks), such as auto-regulation, such as illumination control, brightness exposure and focusing of an auto-focus lens. The lens can be a liquid lens or other type of variable-focus lens. The pre-processor can be constructed and arranged to perform such predetermined auto regulation operations based, at least in part, from information generated by system tasks performed in the at least core. More particularly, the results generated by the cores can include decoded symbology (IDs/codes) imaged from an object.

In an illustrative embodiment, the camera assembly lens can be optically connected with an FOVE that divides the images received at the imager into a plurality of partial images taken along an expanded width. These partial images can be stacked vertically on the imager and include an overlap in the widthwise direction. The overlap can appear in each partial image and can be wide enough to fully image the largest ID/code that is expected to be viewed—thereby ensuring no loss of a symbol due to split-up between fields of view. Illustratively, each of the partial images is respectively processed by a discrete core (or discrete set of cores) of the multi-core processor. To assist in auto-calibration, the FOVE can include a fiducial at a known focal distance with respect to the imager located on the optical path in a manner that allows it to be either selectively or partially exposed to the imager so that runtime image acquisition can be accomplished free of any significant interference by the fiducial. A self-calibration process determines the focal distance (focus) of the lens using the fiducial. The fiducial can illustratively be located on an optical component of the FOVE. Optionally, the FOVE housing supports external illuminator that is removably attached to the housing by interengaging alignment structures and magnets.

The physical package of the camera assembly is constructed from a material with good heat conductance for higher transfer to the ambient environment, such as aluminum alloy. The processor arrangement includes an imager board including the imager and a main board including the multi-core processor, the main board being biased against a side of an interior of the camera housing by a spring-loaded bracket assembly, so as to allow for a secure-but-removable engagement and close engagement with the interior side wall of the camera assembly housing for enhanced heat-transfer from the main board. To further enhance heat transfer and close engagement, the main board includes a profile of projecting circuit components that is arranged to conform to an inner profile of the side of the interior of the camera housing so as to minimize a distance therebetween. The camera assembly housing also includes a plurality of heat-dissipating fins on an exterior side thereof to exchange heat with the ambient environment. The housing further supports one or more external fans. The housing front is adapted to mount a removable lens assembly. Such removable lens assembly can include a liquid lens that is interconnected by a cable to a connector on the side (e.g. front face) of the camera assembly housing. Another connector is provided to control optional internal (or external) illumination. The rear of the camera includes a discrete I/O board interconnected to the main board by an electronic link. The I/O board includes a plurality of externally exposed connectors for various interconnections to data and control functionalities. One such control/functionality is an external speed signal from a line (e.g. an encoder signal) moving relative to a field of view of the camera assembly. The pre-processor and/or the multi-core processor are constructed and arranged to, based on the speed signal and a plurality of images perform at least one of the following operations: (a) control focus of a variable lens; (b) determine focal distance to an imaged object; (c) calibrate focal distance to the line; and (d) determine relative speed of the imaged object. In general, the camera housing includes a front and a rear that are each sealingly attached to each of opposing ends of a body at a respective seam (using a gasket seal). Optionally, the seam between either (or both) the front and the rear, and the body, includes therein a ring of translucent material constructed and arranged to illuminate in one of a plurality of predetermined colors so as to provide an indicator of system status to a user. For example, the ring can illuminate green for a good (successful) ID-read and red for no (failed) ID-read.

In an embodiment, the pre-processor can be adapted to selectively transmit images to the multi-core processor from a buffer memory based upon identification by the pre-processor of features of interest (e.g. symbology/IDs/codes) for further processing in the cores of the multi-core processor.

In an illustrative embodiment, a method for processing images in a vision system includes capturing images at a first frame rate in an imager of a vision system camera, and transferring at least a portion of the images to a multi-core processor. The transferred images are processed to generate results containing information related to the images in each of a plurality of cores of the multi-core processor according to a schedule. The step of processing can further include the step of identifying images containing symbology in the transferred images in at least one of the plurality of cores and performing the step of decoding on the images containing symbology in another of the plurality of cores so that one core identifies if symbology is present (and optionally provides other information relative to the symbology including, for example resolution, symbology type, etc.), and the other core decodes the symbology that has been identified. Alternatively the step of processing can include the step of performing image analysis on the transferred images to identify images having sufficient characteristics for decoding in at least one of the plurality of cores. In other words, the core determines whether the image is sufficiently clear and useable for decoding. Another core performs the step of decoding on images having sufficient characteristics, thereby discarding unusable images before attempting to locate and/or decode symbology. In an embodiment, the step of decoding is performed on the transferred images using a first decoding process (i.e. algorithm) in at least one of the plurality of cores and using a second decoding process in another of the plurality of cores so that decoding is more likely to occur with at least one decoding process. Illustratively, the step of decoding can entail decoding an image in at least one for the plurality of cores, and after a predetermined time interval if (a) the image remains undecoded, and (b) it is probable that the image can be decoded with more time, the image continues to be decoded in another of the plurality of cores. Alternatively, after the time limit elapses and there is a probability that more time will allow a successful decode, then the system can allow the core to continue decoding and assign the next image to a different core. In a further embodiment, the system can provide load-balancing where there exists a plurality of image frames having multiple types of symbology (e.g. 1D codes and 2D codes). Cores split up images in a manner that provides a relatively balanced load of both 1D codes and 2D codes to each.

In further embodiments, the assignment of codes to non-decoding, system tasks can be based on the current trigger frequency. A low trigger frequency, within a threshold, allows cores to be used in system tasks, such as auto-regulation, while a higher trigger frequency dictates that cores are used for decoding (i.e. generating results relative to image information). The various processes related to the assignment of cores, described above, can be intermixed as runtime of the vision system progresses and processing resources (cores) can be reallocated for various purposes.

BRIEF DESCRIPTION OF THE DRAWINGS

The invention description below refers to the accompanying drawings, of which:

FIG. 7 is a perspective view of the vision system FIG. 1 including the vision system camera assembly and depicted field of view expander (FOVE) with associated external bar illuminator mounted thereon, according to an illustrative embodiment;

DETAILED DESCRIPTION

I. System Overview

Figure 1:
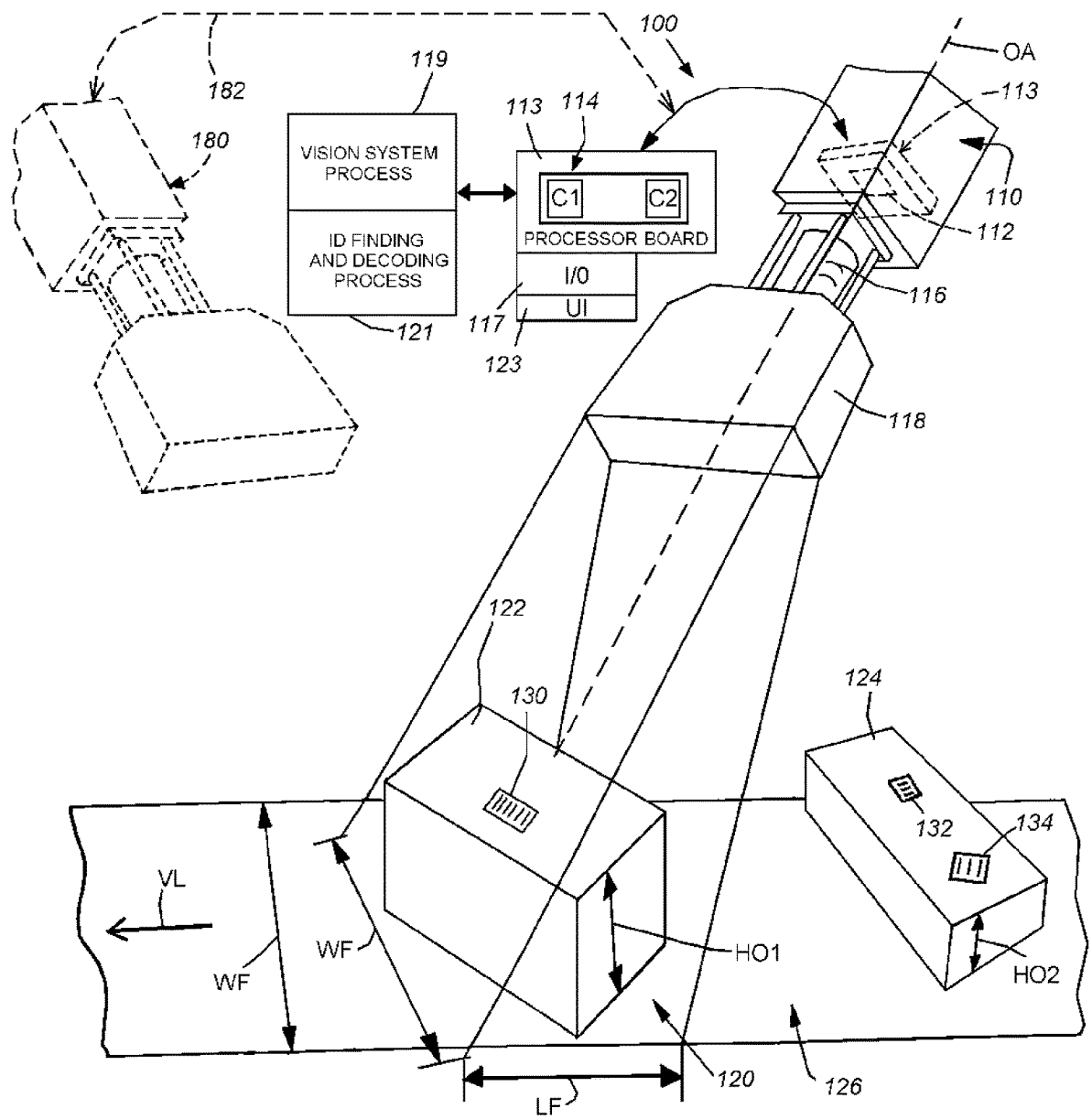
FIG. 1 is a diagram of a vision system arranged with respect to an exemplary moving line having objects of various sizes and shapes containing IDs or other symbology that each pass through the field of view of the system in accordance with an illustrative embodiment.

FIG. 1 depicts a vision system 100, also commonly termed a "machine vision system" according to an illustrative embodiment. The vision system 100 includes a vision system camera 110 that illustratively includes an integral (and/or internal) processor arrangement 114. This processor arrangement 114 allows image data acquired by an imager (for example a CMOS or CCD sensor) 112 (shown in phantom) to be processed so as to analyze information within the acquired image. The imager 112 resides on an associated imager circuit board (also shown in phantom) 113, described further below The processor arrangement 114 in this embodiment includes a multi-core architecture, including at least two separate (discrete) processing cores C1 and C2 that can be provided to a single circuit die (i.e. chip) according to an embodiment. The processor 114 resides on a processor or "main" board 115, also described further below. Likewise, an interconnected input/output (I/O) board 117 and user interface (UI) board 123 for communication with remote devices and display of information are each provided. The function of the imager 112 and multi-core processor 114 are described in further detail below. In general, the processor operates a vision system process 119 that is adapted to take advantage of the multi-core processor arrangement 114 and an ID finding and decoding process 121. Alternatively, all or part of the decoding process can be handled by a purpose-built decoder chip on a separate die from the processor 114.

The camera 110 includes a lens assembly 116 that is optionally removable and replaceable with a variety of conventional (or custom) mounting base lens assemblies. The lens assemblies can be manually or automatically focused. In an embodiment, the lens assembly 116 can include an automatic focus (auto-focus) mechanism based upon known systems, such as a commercially available liquid lens system. In an embodiment, the mounting base can be defined by the well-know cine or "C-mount" base geometry—other known or custom geometries are expressly contemplated in alternate embodiments.

As shown, an illustrative field of view expander (FOVE) 118 is mounted in front of the lens assembly 116. The FOVE allows expansion of the width WF of the field of view 120 that the lens assembly 116 normally defines at a given focal distance to be multiplied by N-times the original width (less the width of any overlap area(s) between fields of view), while the length LF of the field of view 120 is reduced to 1/N times the original length. The FOVE 118 can be implemented using a variety of arrangements, typically including a set of angled mirrors that divide the field into a series of vertically divided portions of the imager. In an embodiment, the above-incorporated FOVE is constructed with outer mirrors directed to receive light from different widthwise portions of a scene, which can be a moving line of objects (as shown in FIG. 1). The outer mirrors thereafter direct the light to associated vertically tilted inner mirrors of a beam splitter that, in turn, direct the light through an aperture in the FOVE substantially in alignment along an optical axis of the camera to avoid distortion of images. The inner mirrors respectively direct the light from each outer mirror into a discrete strip on the imager, with one strip vertically (for example) stacked above the other, and the vision system searches for and analyzes the overall image for features. The fields of view defined by the mirrors include widthwise overlap regions sized and arranged to ensure a centralized feature appears fully in at least one strip. In another embodiment, a moving mirror changes position between acquired image frames so that a full width of the scene is imaged in successive frames. Exemplary FOVE arrangements, including that depicted herein, are shown and described in commonly assigned U.S. patent application Ser. No. 13/367,141, entitled SYSTEM AND METHOD FOR EXPANSION OF FIELD OF VIEW IN A VISION SYSTEM, by Nunnink, et al, filed Feb. 6, 2012, now U.S. Pat. No. 8,646,690, issued on Feb. 11, 2014. This application is hereby incorporated herein by reference by way of useful background information.

In an embodiment the FOVE 118 provides a first outer mirror oriented at an acute angle with respect to an optical axis of the camera and a second outer mirror oriented at an opposing acute angle with respect to an opposing side of the optical axis. A beam splitter is located forward of the first outer mirror and the second outer mirror in a direction taken from the vision system camera. This beam splitter provides a first reflecting surface and a second reflecting surface. The first outer mirror and first reflecting surface are illustratively arranged to direct a first field of view from the scene along the optical axis to the imager. Likewise, the second outer mirror and second reflecting surface are illustratively arranged to direct a second field of view from the scene along the optical axis to the imager. The first field of view is at least in part separated from the second field of view at the scene along a horizontal direction. Additionally, the first outer mirror, the second outer mirror and the beam splitter are arranged to project each of the first field of view and the second field of view in a vertically stacked relationship of strips at the imager. It should be clear that a wide variety of FOVE implementations are expressly contemplated in various embodiments herein.

The FOVE allows a field of view sufficient to image objects 122, 124 (for example boxes) moving at a velocity VL on the moving line 126 with respect to the camera assembly 110 so that features of interest (e.g. barcodes 130, 132, 134) are appropriately acquired. By way of example the width WF of the field of view 120 is expanded to approximately match the width WL of the line 126. It is contemplated in alternate embodiments that objects remain stationary and the camera assembly can move with respect to objects on a track or other appropriate structure (e.g. a robot manipulator). By way of example, two objects 122 and 124 with differing heights HO1 and HO2 respectively pass through the field of view 120. As described above, the difference in height is one factor that typically requires the camera assembly to vary is focal distance. As objects move faster through the field of view 120, the ability to vary focus more quickly becomes highly desirable. Likewise, the ability to more quickly identify features of interest and process these features using the vision system processor 114 is highly desirable. It is expressly contemplated that a plurality of vision system camera assemblies with associated FOVEs, illuminators and other accessories can be employed to image objects passing through a scene. For example, a second vision system 180 (shown in phantom) is provided to image an opposing side of objects. This additional vision system 180 is shown linked (connection 182) to the above-described system 100. This allows sharing of image data and synchronization acquisition and illumination triggers, among other functions (for example using a master-slave arrangement of interconnected camera assemblies described below). Each camera assembly can independently process image data or can perform some or all processing in the cores of an interconnected camera assembly in accordance with the various multi-core processes described below. The number, placement and operation of further vision systems is highly variable in various embodiments.

II. System Electronics

Figure 2:
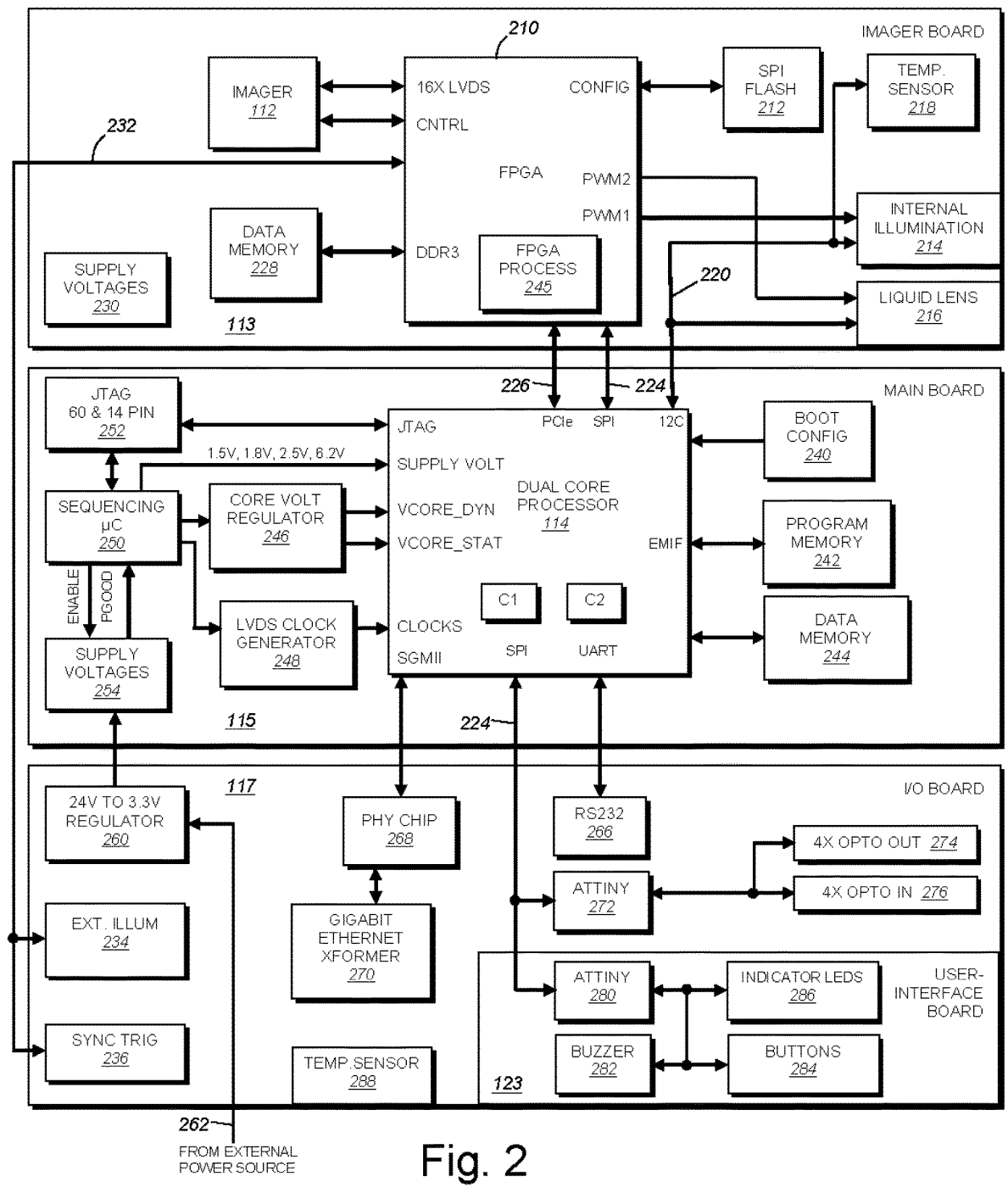
FIG. 2 is a block diagram of the circuitry for acquiring and processing image data, and for controlling various system functions in accordance with an illustrative embodiment.

With reference also to FIG. 2, the circuit layout and function of the imager circuit board 113, main circuit board 115, I/O circuit board 117 and UI circuit board 123 are each described in further detail. As shown, the imager 112 is located on the imager board 113, and can comprise a commercially available CMOS 2-megapixel grayscale unit, such as the model CMV2000 from CMOSIS of Belgium. Other types of and sizes of imagers can be provided in alternate embodiments including larger or smaller resolution imagers, color imagers, multi-spectral imagers, etc. The imager is operatively connected via control and data connections to an FPGA (or other programmable circuit) 210 that carries out an image handling process in accordance with an illustrative embodiment to be described further below. For the purposes of this description, the FPGA or equivalent high-speed processing logic, such as an ASIC, DSP, and the like, can be termed an "imager-interconnected" "pre-processor" that performs initial and/or certain auto-regulation functions to the received stream of image frames from the imager. Thus, while an FPGA is described by way of example, any programmable or non-programmable processing logic (or multiple logics) that can perform the desired pre-processing functions is expressly contemplated for use as the "pre-processor". An exemplary pre-processor circuit is the ECP3 family of FPGAs available from Lattice Semiconductor of Hillsboro, OR. The FPGA 210 is interconnected with an appropriately sized nonvolatile (Flash) memory 212 that provides configuration data to the FPGA. The FPGA 210 also controls optional internal illumination 214 (described further below) and an optional variable (e.g. liquid) lens assembly 216 for providing fast auto-focus to the camera lens assembly. Also, while the pre-processor described herein is adapted to perform certain functions, including but not limited to auto-regulation, image data conversion and acquired image data storage handling, a variety of additional processes that can be directly related to processing of information within images (i.e. vision system processes) can be performed by the pre-processor, such as feature-finding, and the like. More generally, the high frame rate of the imager makes desirable (in various embodiments) the use of such a high-speed processor to handle initial processes with respect to acquired image frames.

One form of fast-operating liquid lens assembly that can be employed herein is the EL-6-18-VIS-LD membrane-based liquid lens available from Optotune AG of Switzerland. In addition to high speed operation, this lens defines, illustratively, a 6 millimeter aperture making it highly suitable for wider-area, high-speed operations. The illustrative variable lens package is sized 18–18.4–8.9 (thickness) millimeters. Control current is between approximately 0 and 200 mA. Response time is typically less than 2 milliseconds and settling time is typically less than 10 milliseconds. After integration of the liquid lens into the illustrative lens assembly, the field of view of the overall assembly is approximately 20 degrees and the focal tuning range is approximately 60 millimeters and infinity. In operation, the EL-6-18-VIS-LD is a shape-changing lens. It consists of an injection-molded container, which is filled with an optical fluid and sealed off with an elastic polymer membrane. The deflection of the lens is proportional to the pressure in the fluid. The EL-6-18 employs an electromagnetic actuator that is used to exert pressure on the container. Hence, the focal distance of the lens is controlled by the current flowing through the coil of the actuator. This distance decreases with increasing applied current.

A temperature sensor 218 is provided in association with the lens to monitor operating temperature adjacent to the lens. This allows for temperature-based adjustment of the liquid lens, as well as other temperature-dependent parameters and functions. The temperature sensor resides on an I2C bus 220 that also controls internal illumination 214 and the liquid lens using appropriate control signals that are specified by the lens manufacturer. As described below, additional temperature sensors can be provided to one or more circuit boards (e.g. sensor 288) to monitor the temperature state of various components of the system. The bus 220 interconnects with the multi-core processor 114 on the main board 115 as shown. Likewise, the FPGA 210 is tied to the processor 114 by a Serial Peripheral Interface (SPI) bus 224 and a PCIe bus 226 that respectively carry control and data signals between the units. Illustratively, the SPI 224 bus interconnection between the FPGA 210 and processor 114 is used is employed by the processor 114 to configure the FPGA during system boot-up. Following configuration, communication of image data, and other system data, is carried over the PCIe bus 226. The PCIe bus can be configured as a 2× lane. The FPGA 210 is also interconnected with a 64 Mbyte data memory 228 via a 16-bit interconnection that allows buffering of image data so that the high frame rate of the imager can be accommodated at the imager board level—and such image frames can be subsequently employed for either downstream image processing or auto-regulation functions as described further below. In general, part of auto-regulation may entail use of lower-resolution images. Thus, a sequence of acquired images can be stored in the memory 228 at lower resolution (sufficient for FPGA functions) while higher resolution images are forwarded to the processor 114 for use in processes described further below. The memory 228 can be any acceptable type, such as a DDR3 dynamic RAM. Alternatively another memory type can be employed, such as static RAM (SRAM). Appropriate supply voltages 230 for the various imager board components are also provided and sourced from an external voltage supply (typically 120-240 VAC wall current with appropriate transformers, rectifiers, etc.).

A link 232 also illustratively connects the FPGA 210 with an external illumination control connector 234 on the I/O board 117 and exposed on the rear exterior of housing of the camera assembly 110. Likewise, the link 232 also interconnects the FPGA with a sync trigger connection 236 on the I/O board 117 to synchronize image acquisition (including illumination triggers) with other interconnected camera assemblies. This interconnection can occur where multiple camera assembles simultaneously image multiple sides of a box, and/or where boxes move through multiple, relatively adjacent stations on a line. Synchronization avoids cross talk between illuminators, and other undesirable effects. More generally, it is noted that various image acquisition functioning and/or processes, including internal and external illumination, focus and brightness control are all controlled directly by the fast-operating FPGA process 245 in this embodiment. This allows for the main board processor 114 to focus operations upon vision system tasks on, and decoding of, image data. In addition, synchronization of acquisition also allows multiple camera assemblies to share a single illuminator or group of illuminators, as the illuminator(s) are triggered independently for each camera as it acquires an image frame.

Note that appropriate interfaces can be provided for external triggers. Such external triggers can allow for gating of the camera assembly so that image acquisition occurs when a moving object is in range of the field of view. This gating avoids acquiring unnecessary images of the space between objects on the line. A detector or other switching device can be used to provide a gating signal according to conventional techniques.

The FPGA 210 functions to provide certain pre-processing operations on the image in order to increase speed and efficiency of image data handling. Image data is transferred serially from the imager 112 to the FPGA. All or portions of the data can be stored temporarily in the data memory 228 so that it can be analyzed for various FPGA operations. The FPGA 210 translates the serial image data to a PCI express (PCIe) protocol using conventional techniques so that it is compatible with the data bus architecture of the processor and it is transmitted to the processor 114 over PCIe bus 226. The image data is then transferred directly into the data memory 244 for subsequent processing by the cores C1 and C2 of the processor. The use of multiple cores allows for many desirable and efficiency-enhancing operations when processing image data, which are described in detail below. The FPGA 210 is also programmed (i.e. the FPGA process 245) to analyze the acquired image data to perform specific system auto-regulation operations such as automatic brightness control (i.e. auto exposure) and auto focus control using, for example, the liquid lens assembly 216. Typically, where focal distance changes, such as when differing height objects are encountered, both brightness and focus require adjustment. In general, these operations entail a higher image acquisition rate at the imager 112 (e.g. acquiring at approximately 200-300 image frames per second) to allow for additional operations on image data while the net decoding rate at the processor 114 is at least 100 frames per second. That is, some images are processed within the FPGA, while others are transferred to memory on the main board 115 for vision system processing (e.g. ID finding and decoding of found IDs in the image) without compromising the maximum frame rate of the processor. More generally, the data memory 228 buffers image frames as acquired and employs some frames (from the excess number of image frames available due to the high frame rate) for use in auto-regulation functions by the FPGA 210, whilst transferring other frames to the processor 114 for further processing. The division of functions between the FPGA 210 and processor 114 facilitates this efficiency and a more optimized utilization of system resources.

In various embodiments, the FPGA 210 and memory 228 can be adapted to receive a "burst" of image frames at the high acquisition frame rate, employing a portion thereof to perform auto-regulation and transmitting others to the processor at a rate that is appropriate to its processing speed. This high volume of image frames obtained from the "burst" (for example, while the object is in the field of view), can be fed out to the processor 114 before and during the interstitial time up to the point in which the next object arrives at the field of view—in which the next "burst" is acquired, stored and transmitted to the processor 114.

As used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

With reference to the main board 115 in FIG. 2, the multi-core processor 114 is shown. A variety of processor types, brands and/or configurations can be employed to carry out the teachings of the embodiments herein. In an illustrative embodiment, the processor 114 comprises a dual core DSP such as the model 6672 available from Texas Instruments Inc. of Dallas, Tex. This processor 114 is sufficiently fast operating and cost-effective for the purposes of the vision system applications contemplated herein. As used herein the term "multi-core" shall refer to two (i.e. "dual core") or more discrete processors instantiated on a single die and/or encapsulated in a single board-mounted circuit chip. Each core is generally capable of independent processing of at least a portion of the stored data in the memory 244. The processor 114 is interconnected with a non-volatile memory 240 containing appropriate boot configuration data. This allows for basic operation of the processor at camera system startup including loading of any program code and/or operating system software. The program code/operating system software is stored in a program memory 242 that can be configured using a variety of solid state memory devices. In an illustrative embodiment a NOR Flash memory with 32 Mbyte capacity and a 16-bit interconnection is employed. Upon boot up, the program code is loaded from the flash program memory 242 into a data memory 244. Image data and other data that the processor operates upon are also stored in a data memory 244 and can be flushed from the data memory when no longer needed by system processes. A variety of memory types, sizes and configurations can be employed. In an embodiment, the memory is a 256 Mbyte DDR3 dynamic RAM with a 64-bit interconnection.

Other conventional circuits used to drive the processor and provide other functions (such as debugging of code) are also provided on the main board 115 and interconnected with the processor 114. These circuits can be configured in accordance with ordinary skill, and can include a core voltage regulator 246 (for example, a model UCD7242 from Texas Instruments), an LVDS clock generator 248 (for example a model CDCE62005 also from Texas Instruments) and a sequencing micro controller 250 (for example a PIC18F45 from Microchip Technology Inc. of Chandler, Ariz.). A JTAG interface 252 (e.g. a 60 pin and 14 pin) is also interconnected between a port on the processor 114 and the sequencing microcontroller 250. Appropriate voltages (e.g. 1.5V, 1.8V, 2.5V and 6.2V) are provided to various circuit components on the main board 115 by a voltage supply 254 that is linked to a regulator 260 (e.g. a 24V to 3.3V regulator) on the I/O board. This receives external power from the source (e.g. a 24V wall transformer) via an appropriate cable 262. The main board 115 and associated processor 114 are interconnected to the I/O board via a processor-mounted UART that interconnects a serial connector 266 on the exterior of the housing configured according to the RS-232 standard. This port can be used to control external functions, such as alerts, conveyor line shutdown and the like. The processor also includes a serial gigabit media independent interface (SGMII) that connects to an Ethernet port on the rear of the housing via a physical layer chip 268 and gigabit Ethernet transformer 270. This allows image data and other control information to be passed to a remote computer system via the network. It also allows for user programming of the system's functions via an interfaced computer and appropriate user interface (e.g. a web-based graphical user interface/browser screen(s)). Wireless Ethernet links, Bluetooth® communication, etc. can also be provided to the camera assembly as an option in various embodiments (not shown).

The processor SPI bus 224 interconnects to an appropriate ATTINY microcontroller 272 (available, for example from Atmel Corporation of San Jose, Calif.), which interfaces to a 4× optical in 274 and 4× optical out 276 using conventional techniques. This interface provides for "slow" I/O operations including external gating trigger inputs, good-read and bad-read outputs, encoder inputs (e.g. counting movement pulses on a moving line drive assembly), object detection, and a variety of other I/O functions. The bus 224 also connects a further ATTINY microcontroller 280 on the UI board 123. This microcontroller interfaces with user interface (UI) devices on the exterior rear of the of the camera assembly housing. These devices include, but are not limited to, an audible tone generator (e.g. a buzzer) 282, one or more control buttons 284 and one or more indicator lights (e.g. LEDs) 286. These devices allow the user to perform a variety of functions, including training of the vision system, calibration, and the like, and to receive status of system operation. This can include on/off functionality, fault alerts, success/failure in reading IDs, etc. Common status indicators (LEDs) can be associated with trigger-on, trigger-off, encoder and object detection status. Other interface devices (not shown) such as a display screen and/or alphanumeric display can also be optionally provided. The I/O board 117 includes an appropriate temperature sensor to monitor internal temperature.

It should be clear that the location and positioning of components on each the various boards as well as the functions of those components is highly variable. It is expressly contemplated that more or fewer circuit boards can be employed in various embodiments. Likewise, some or all of the functions of a plurality of components can be combined into a single circuit, or some or all of the functions of a particular depicted component can be split into a plurality of circuits on one or more boards. Moreover, the components, interconnections, bus architecture and functions depicted in FIG. 2 are merely illustrative of a variety of circuit layouts that can perform similar functions to those described. The construction of alternate circuit layouts with similar or the same functionality should be clear to those of skill in the art.

III. Physical Package

Having described the arrangement of electronic components on the various circuit boards of the camera assembly, and their respective interconnections and functions, reference is now made to FIGS. 3-7, which describe the physical structure of the camera assembly 110. FIGS. 3-6 depict the camera assembly 110 with a conventional lens 310 and surrounding internal (ring) illumination assembly 320 according to an embodiment. FIG. 7 is a more detailed external view of the camera assembly 110 with optional FOVE attachment 118 and associated lens assembly 116 as depicted in FIG. 1.

The housing 330 of the camera assembly 110 is constructed from a material with appropriate rigidity and thermal transfer properties. In an illustrative embodiment, an aluminum alloy (e.g. 6061) can be employed to construct some or all of the housing. The body 332 is also provided with unitarily formed longitudinal fins 339 about its perimeter to further assist in heat transfer. The housing 330 consists of three primary sections, a body 332, a front 334 and a rear 336. The body 332 is a single piece with an open interior. The front 334 and rear 336 are each secured to opposing ends of the body using screws seated in holes 338 and 410, respectively. The front 334 and rear 336 are compressed against the ends of the body to form a vapor-tight seal that protects the internal electronics against dust, moisture and other contaminants that can be present in a manufacturing or other processing environment. A gasket (e.g. an O-ring) 510 (See FIG. 5) is positioned at each respective end of the body 332 to seal against each of the front 334 and the rear 336 in compression. Note that the body can be formed as an extruded structure with appropriate bored of holes and other machined shapes applied to the exterior and interior as appropriate.

Figure 5:
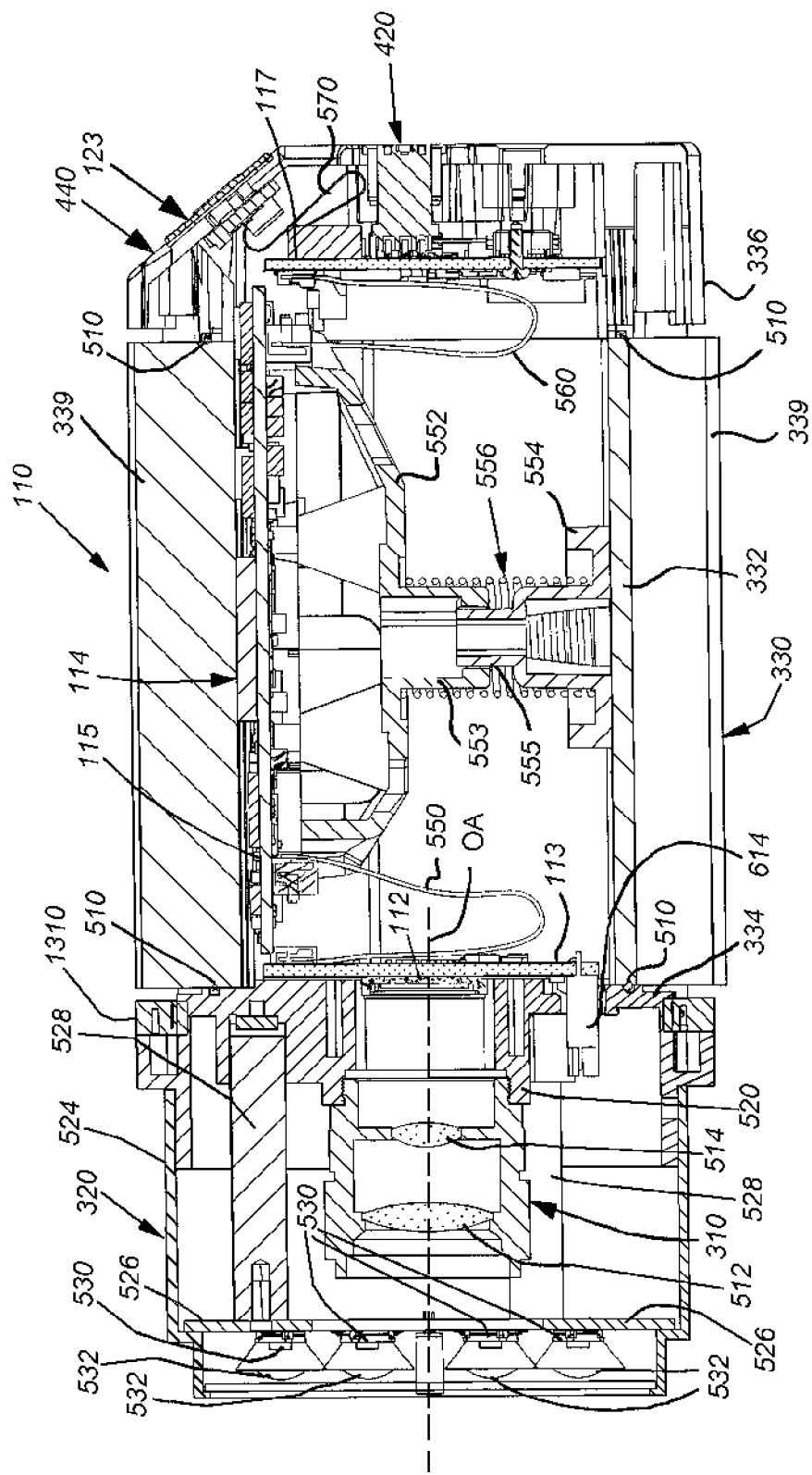
FIG. 5 is a side cross section of the vision system camera assembly taken along line 5-5 of FIG. 3.

As also shown in FIG. 5, the imager board and associated imager 112 are secured against the front 334 with the imager perpendicular to the optical axis OA defined by the lens assembly 310. In this embodiment a fixed lens assembly 310 is employed, having front and rear convex lenses 512 and 514 in a conventional arrangement. By way of example, the depicted lens assembly is a 16 mm lens assembly with a C-mount base. It is threaded into the camera assembly lens base 520, which projects from the front 334. Other lens types and mounting base configurations are expressly contemplated in alternate embodiments as will be described further below.

Figure 6:
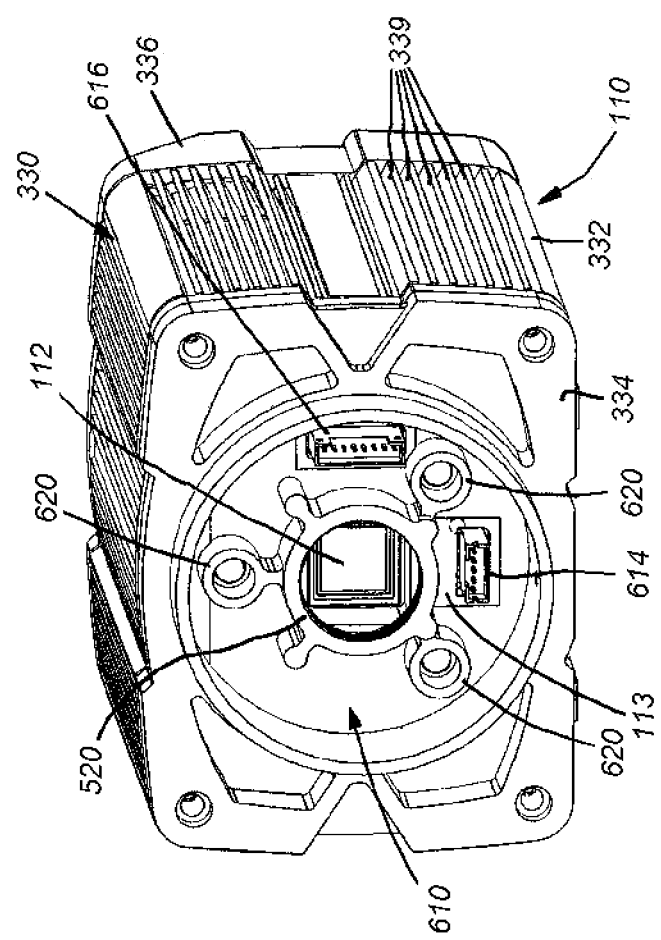
FIG. 6 is a frontal perspective view of the vision system camera assembly of FIG. 1 with the internal illumination assembly and lens removed.

The lens is surrounded by an annular internal ring illumination assembly 320 having an outer shroud 524 and an illumination circuit board 526 at the front end thereof. The circuit board 526 is supported on three standoffs 528 arranged in a triangular orientation about the optical axis OA. In this embodiment, the illumination is provided by eight high-output LEDs 530 (for example OSRAM Dragon LEDs) with associated lenses 532. The LEDs can operate in a selected, discrete visible and/or near-visible (e.g. IR) wavelength. In various embodiments, differing LEDs operate at different wavelengths that can be selected by the illumination control process. For example some LEDs can operate in a green wavelength, while others can operate in a red wavelength. With reference to FIG. 6 in which the illumination assembly 320 has been removed, the front face 610 of the camera assembly 110 is exposed. This face 610 includes a pair of multi-pin connectors 614 and 616 that reside on the imager board and are analogous to diagram components 214 and 216 in FIG. 2. That is, the five-pin connector 614 is interconnected by a cable (not shown) to the illumination board 526. The eight-pin connector 616 is connected to control and power the optional liquid lens assembly described further below. The face 610 also includes three bases 620 (which can be threaded) to support each of the illumination circuit board standoffs 528. The threaded C-Mount base 520 is also visible. Note that the depicted internal illumination assembly 320 is an optional implementation for the vision system camera assembly. In various embodiments described herein, the internal illumination assembly can be omitted in substitution for one or more external illumination assemblies or, in certain special circumstances, ambient illumination.

Figure 13:
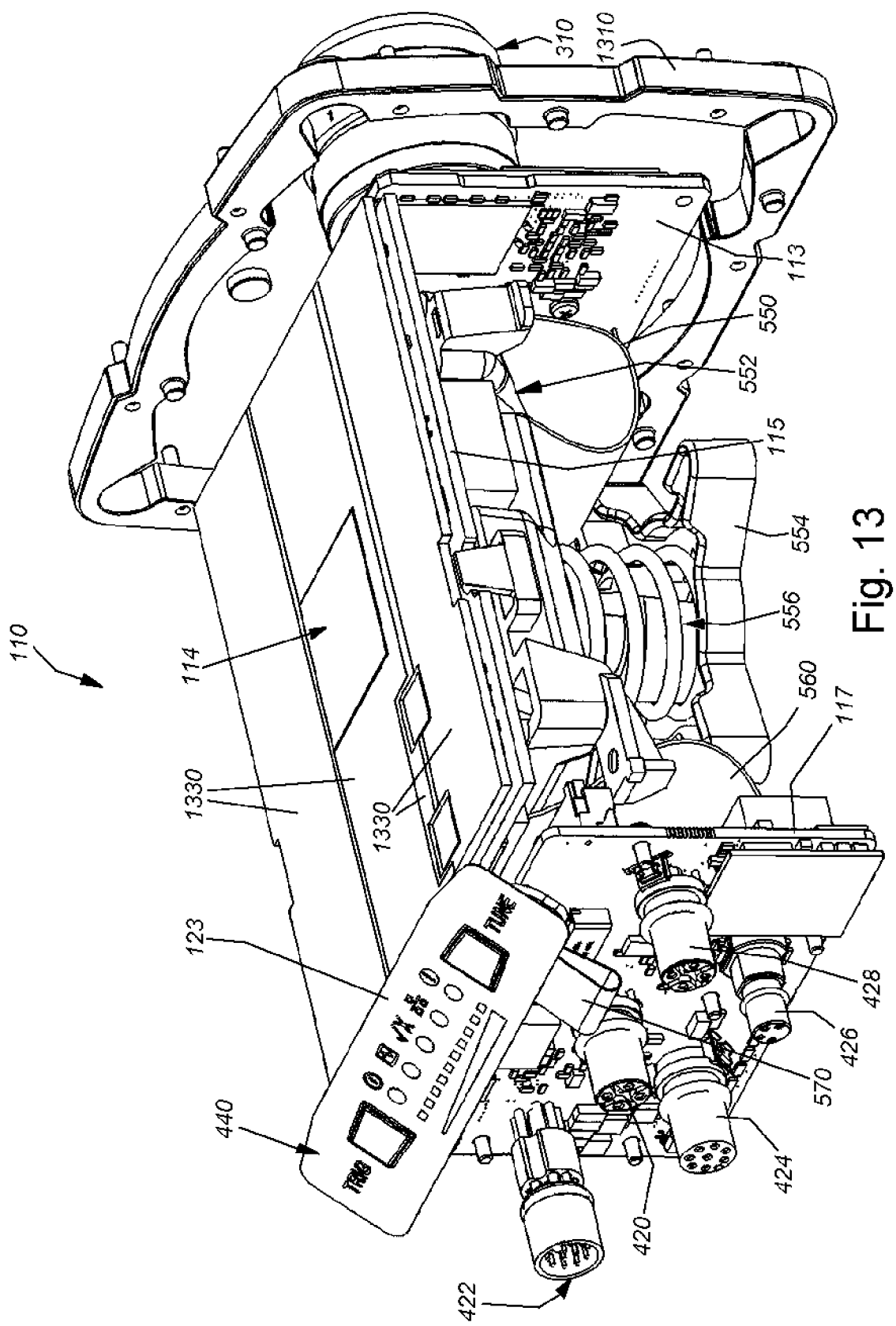
FIG. 13 is a rear perspective view of the internal components of the camera assembly of FIG. 1 with housing body removed and detailing the structure of a "360-degree" ring indicator between the body and front thereof.

Referring particularly to the cross section of FIG. 5, the imager board is connected by a ribbon cable 550 to the main board 115 which is located illustratively against the top side of the body interior. The main board, in this position communicates thermally with the body 332 and associated fins 339, allowing for better thermal transfer. The main board 115 can be mounted using fasteners, or as shown, using a bracket member 552 that engages the underside of the main board 115 at locations that are free of interference with circuit components on the board. The bracket 552 includes a lower extension 553 with a hole that rides the upwardly extended vertical post 555 on a base 554 in a telescoping fashion. The base 554 is seated on the bottom side of the housing body 332. The bracket 552 is biased upwardly by a compression spring 556 positioned between the underside of the bracket and the base 554 and surrounding both the extension 553 and post 555. This arrangement allows the board to be inserted or removed by manipulating the position of the bracket 552 relative to the base 554. That is, to install the board 115, the user depresses the bracket 552 against the bias force of the spring 556, slides the board 115 into the interior of the body 332, and releases the bracket 552 to pressurably engage the board 115 and maintain it in place against the interior top of the body 332. Removal is the reverse of this process. The board 115 is maintained is firmly engagement against the body 332 by the spring 556, thereby ensuring adequate heat transfer. In various embodiments, the main board 115 can also include on-board heat sinks that interface with the body 332. Likewise, thermally conductive paste, or another thermal-transfer medium, can be located between contacting portions of the board 115 (e.g. the processor 114) and the interior surface of the body 332. With brief reference to FIG. 13, described further below, the top side of the main board 115 can include thermal gap pads 1330 that fill the gap between the top of the board 115 and interior surface of the body.

Figure 5A:
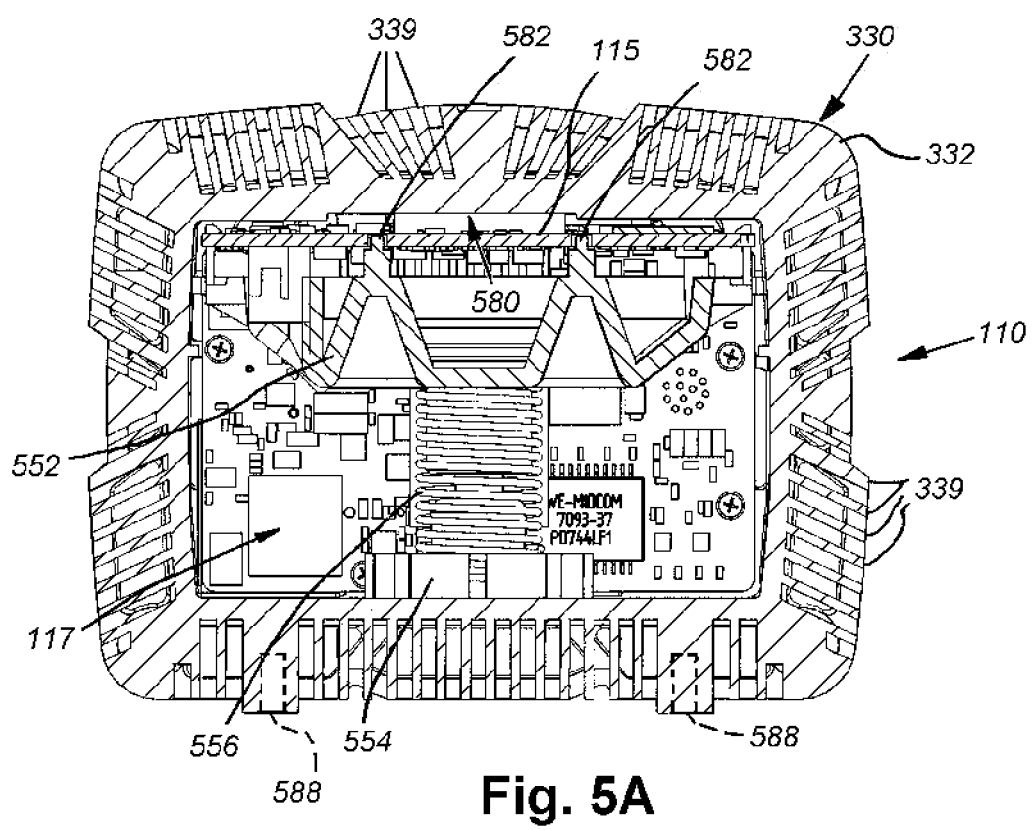
FIG. 5A is a rear cross section of the vision system camera taken along FIG. 5A-5A of FIG. 3.

More generally, with reference also to FIG. 5A, the profile of the interior surface 580 of the body 332 with respect to the main board 115 is shaped so that it conforms closely to the shape of projecting, surface-mount, circuit components on the main board 115, and the components are mounted to accommodate the shape of the body. That is, taller components can be placed toward the longitudinal center line where a taller profile exists in the body, while shorter components are located along either side of the longitudinal axis of the main board. More generally, components are divided into height zones that conform to the geometry of the interior of the body. Where certain circuits tend to be large or tall (e.g. capacitors) these components can be split into two or more smaller components with the same overall electronic value as a single larger component. Thermal gap filler (i.e. pads or another medium) is provided between the board and the interior top, and this placement of components ensures that the distance between the body and components is minimized for both short and tall components based upon the interior geometry of the body. Illustratively, the multicore processor is arranged as shown to contact the interior side of the body directly (typically with a thin layer of thermally conducting paste or the like therebetween) so that the body acts an effective thermal heat sink for the processor. Also as shown, the main board 115 is indexed laterally with respect to the bracket 552 by posts 582 that pass through holes in the board. This ensures that the bracket and board maintain a predetermined alignment with respect to the body. Note, while cooling is passive in the depicted embodiment, in further embodiments one or more fan units can assist in cooling the interior or exterior of the housing. In particular, there are provided four mounting holes 588 along the bottom of the body 332 (two of which are shown in phantom in FIG. 5A). These holes 588 are positioned to receive a conventional 60×60 millimeter computer fan in this embodiment. Alternatively, as described below, the holes 588 can be positioned to receive an intermediate bracket that is adapted to mount a fan and/or other fan arrangements/sizes are expressly contemplated. A connection can be provided on the housing or an external connection with an appropriate voltage adapter can be employed to power the fan(s). In addition, auxiliary cooling arrangement (e.g. liquid cooling) can be employed in alternate embodiments. In general, the system is designed to operate using ambient cooling up to approximately 40° C. However, in certain environments where the operating temperature can exceed this value, the use of at least one cooling fan is enabled.

As shown in FIG. 5, the I/O board 117 is mounted against the inside rear 336 of the camera assembly housing 330. The I/O board 117 is connected by a ribbon cable 560 to the rear end of the main board 115. Various rear connectors 420, 422, 424, 426 and 428 (see also FIG. 4), the functions of which are described above with reference to FIG. 2 extend from the rear side of the I/O board 117. The I/O board is, likewise, interconnected to the UI board 123 by a ribbon cable 570. As shown, the UI board is exposed to the user along an angled top surface 440 of the rear 336. The arrangement and location of circuit boards on and/or within the body can be varied in other embodiments.

Figure 7A:
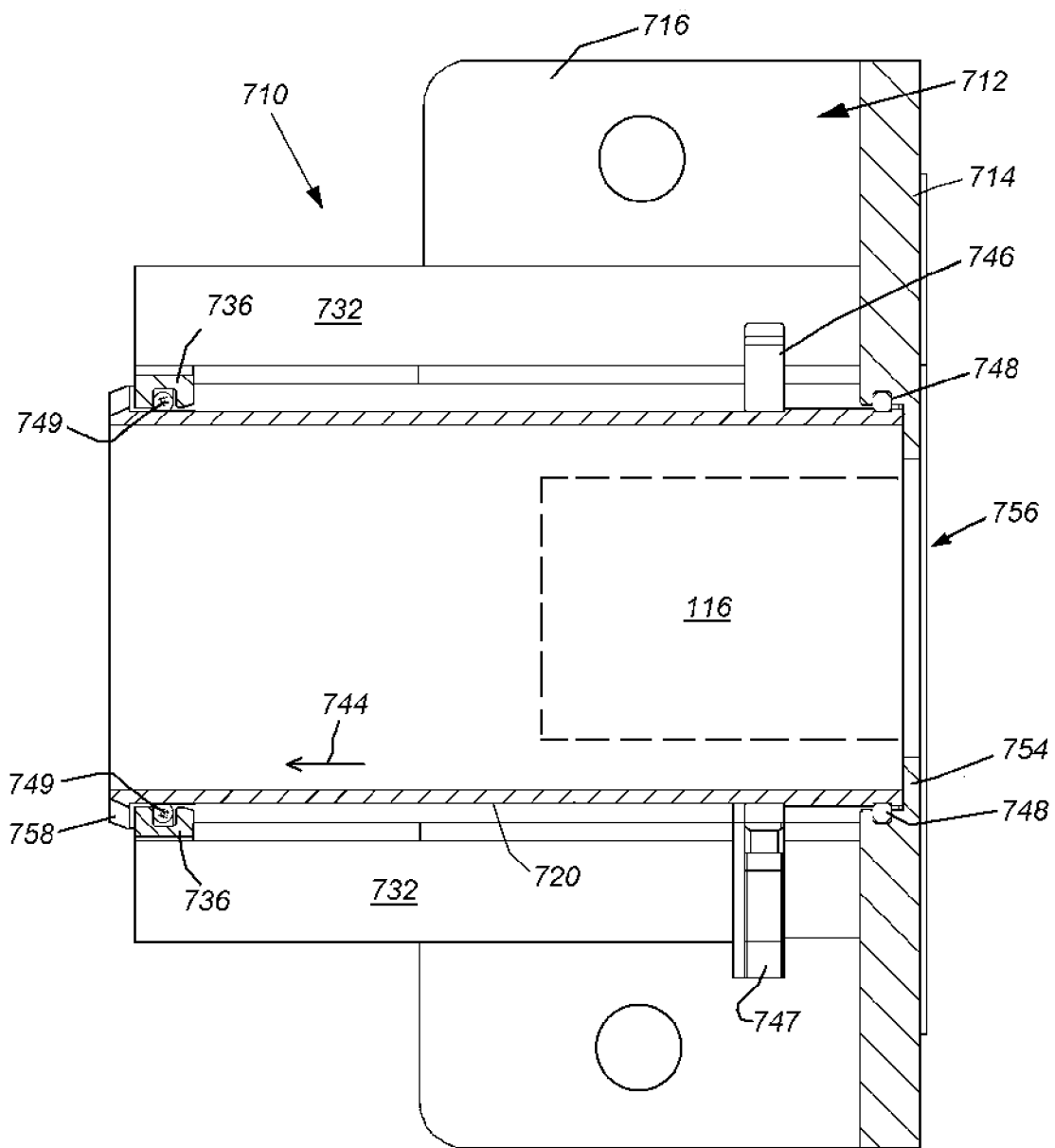
FIG. 7A is a more detailed top cross section of the coupling provided between the FOVE housing and camera assembly front according to FIG. 7.

With reference to FIG. 7 and the more detailed cross section of FIG. 7A, the FOVE 118 is shown attached by a coupling 710 that includes a removable L-Shaped bracket 712 on the camera assembly front. This bracket 712 includes a vertical plate 714 that confronts the camera front 334 and is secured with fasteners, and a horizontal plate 716 that is adapted to secure further mounting brackets and supporting structures thereto. The bracket 712 of the coupling 710 can also be used to mount a removable illuminator 750, as described below. The FOVE housing 730 is supported with respect to the camera assembly by a set of four posts 732 that are secured into the base bracket on the camera side and that are secured to the rear wall 736 of the FOVE housing. The flange 736 is secured to a rear of the FOVE housing 730 by appropriate fasteners or other securing mechanisms (not shown). The lens assembly 116 is covered by the depicted cylindrical outer shroud 720 that extends between the front face (610) of the camera assembly 110 and the rear of the FOVE housing 730. This shroud 720 is movable and serves to seal the lens and FOVE housing against dust and infiltration of external environmental contaminants. The posts 732 or another acceptable open framework allows for access to the lens assembly 116 for adjustment and service. The posts 732 movably (double arrow 744) support a slider 746 that engages a sliding lens shroud 1692. a pair of tabs 747 containing low-friction bushings ride along two (or more) of the posts 732. O-rings 748, 749 are embedded within the inner circumference of the flange 736 and the opposing vertical face 714 of the L-shaped bracket 712. The lens shroud 720 can be slid forwardly out of the depicted sealed position to reveal the lens 116 assembly (shown in phantom in FIG. 7A as an exemplary lens type). The vertical face 714 is formed with a stop shoulder 754 that defines the central orifice 756. This shoulder prevents further forward movement of the shroud 720 toward the camera assembly after it is sealingly engaged. A rear stop 758 is also provided on the front end of the shroud 720 to engage an inner face of the flange 736. The forward slidable movement of the shroud 720 passes it into the interior of the FOVE housing 730 until the slider engages the exterior wall of the flange 736. This should provide ample room to access the lens 1697 for adjustment and/or service. The FOVE housing 730 can be constructed from a variety of materials including various polymers, such as injection molded, glass-filled polycarbonate and/or composites, or metals, such as aluminum. In particular, glass-filled polycarbonate minimizes dimensional tolerance due to shrinkage during the molding process. The front end of the FOVE housing is open to the scene and includes a covering transparent window 740.

Figure 8:
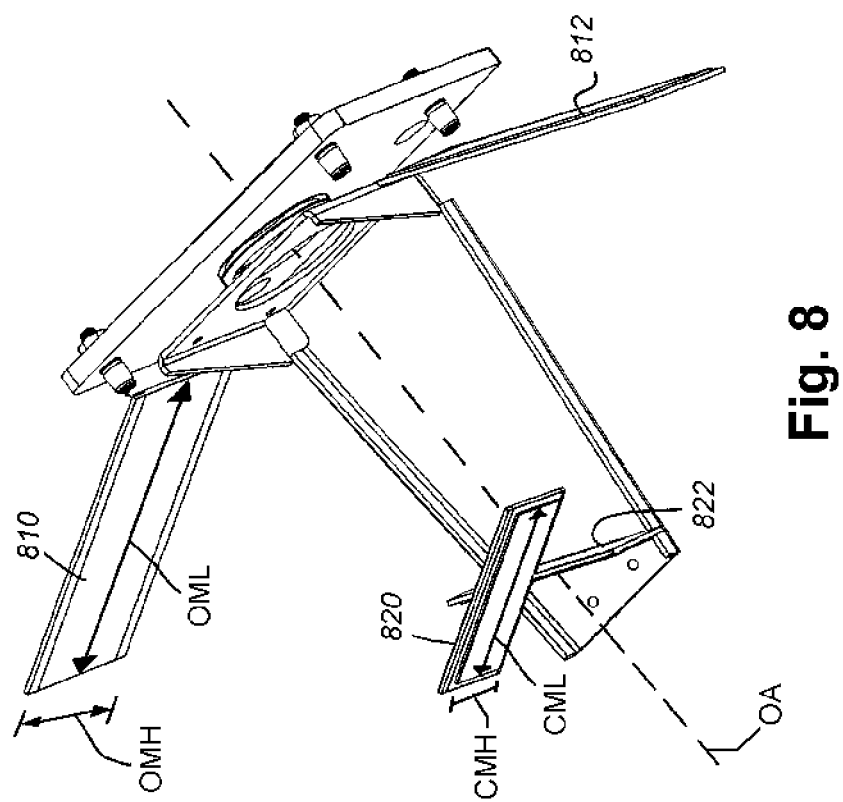
FIG. 8 is a perspective view of the optical components of the illustrative FOVE of FIG. 7, shown with housing removed.
Figure 9:
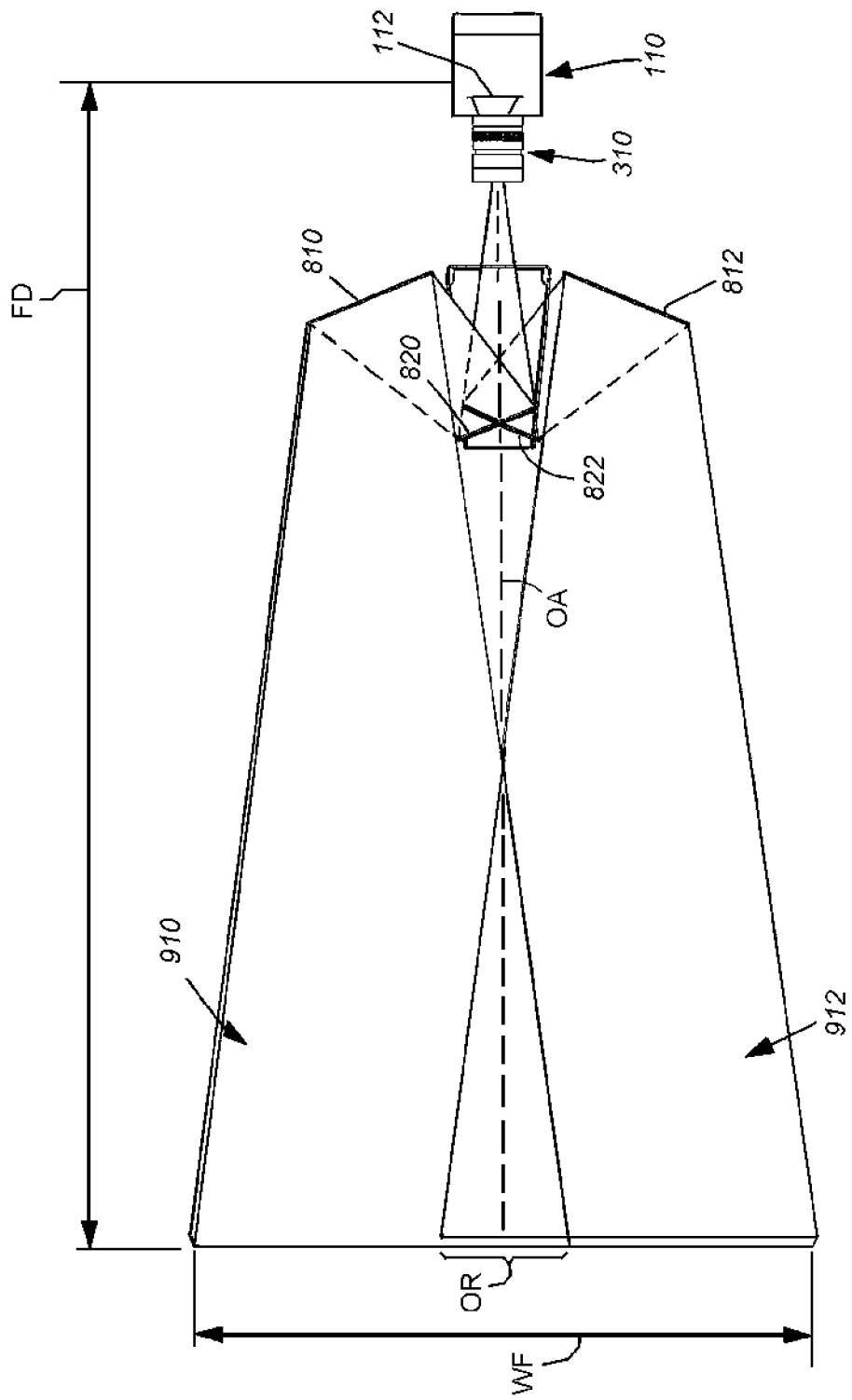
FIG. 9 is a plan view of the optical components of the illustrative FOVE of FIG. 7, shown with housing removed and acquiring an image of a wide field of view.

With further reference to FIGS. 8 and 9, the geometry of the FOVE's mirrors is shown in further detail with housing 730 removed. While a variety of optical components and arrangements can be employed to provide an FOVE in various embodiments, it is generally contemplated that the FOVE divides a wide image into at least two stacked images (strips) that each occupy a portion of the imager. In this manner the image height is reduced by approximately one-half (with some overlap), while the width of each strip is (also with some overlap) the full width of the imager. Given the dual core processing capabilities and high image acquisition speed provided by the illustrative camera assembly, efficient and rapid processing of the pair of strips can be performed using a variety of processing techniques (described further below). Illustratively, the depicted FOVE 118 is based upon the above-incorporated U.S. patent application Ser. No. 13/367,141, entitled SYSTEM AND METHOD FOR EXPANSION OF FIELD OF VIEW IN A VISION SYSTEM, by Nunnink, et al. Further embodiments of FOVE arrangements that can be employed in accordance with the vision system camera assembly, and associated couplings and accessories, are also described by way of further useful backround information in commonly assigned continuation-in-part U.S. patent application Ser. No. 13/645,241, entitled SYSTEM AND METHOD FOR EXPANSION OF FIELD OF VIEW IN A VISION SYSTEM, by Nunnink, et al., filed on Oct. 4, 2012, now U.S. Pat. No. 9,027,838, issued on May 12, 2015, and the teachings of which are expressly incorporated herein by reference.

Figure 10:
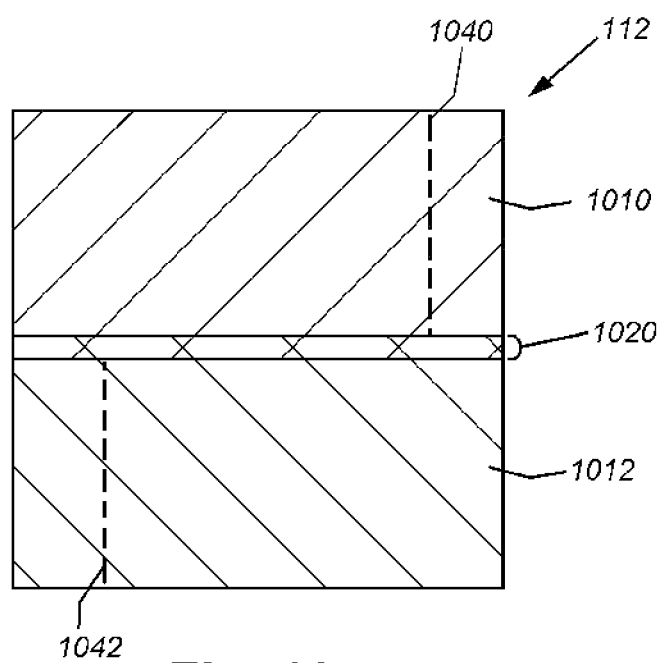
FIG. 10 is a schematic view of a stacked arrangement of multiple fields of view provided by the FOVE of FIG. 7 to the imager of the camera assembly.

As shown in FIG. 8, the optical components of the FOVE include left and right outer mirrors 810 and 812 and stacked, crossing inner mirrors 820 and 822. The outer mirrors 810 and 812 are tilted at differing angles. Likewise the inner mirrors 820, 822 are tyilted at different angles. Referring to FIG. 9, the field of view 910 and 912 of each outer mirror 810 and 812 is shown. There is a slight overlap region OR that is at least as wide as the largest feature of interest (e.g. largest barcode) to be imaged at the focal distance FD. This ensures that a full image of the feature appears in at least one of the two fields 910, 912. Each imaged field 910, 912 field is reflected by its respective outer mirror fully onto one of the inner crossing mirrors 820, 822 as shown. The reflected image is then further reflected into the lens 310 with each of the fields stacked vertically relative to the other (due to the relative tilts of each mirror 810, 812, 820, 822). Thus, as shown schematically in FIG. 10 each field 910, 912 is respectively projected onto each of a pair of stacked strip regions 1010, 1012 on the imager 112. A relatively small, vertical overlap region 1030 can be provided, which includes images of both fields 910, 912. The overlap in the vertical direction depends upon the aperture of the lens assembly, and can be minimized using a small aperture setting, such as F:8. The dashed lines 1040 and 1042 on each strip represent the horizontal overlap of fields OR in FIG. 9. This region is analyzed for complete features (e.g. IDs) that can be present fully in one strip and all, or partially, missing in the other strip.

In an illustrative embodiment, and by way of example of representative sizes, the outer mirrors 810, 812 each have a horizontal length OML of between 40 and 120 millimeters, and typically 84 millimeters, and a vertical height OMH of between 20 and 50 millimeters, and typically 33 millimeters. Likewise, the crossing inner mirrors 820, 822 illustratively have a horizontal length CIVIL of between 30 and 60 millimeters, and typically 53 millimeters, and a vertical height CMH of between 10 and 25 millimeters, and typically 21 millimeters. The overall horizontal span of the outer mirrors 810, 812 is approximately 235 millimeters in an illustrative embodiment, and the spacing MS between each respective outer and associated inner mirror surface (i.e. 210 and 220; 212 and 222) is approximately 100 millimeters. Based upon the forgoing measurements and with appropriate focus adjustment in a selected camera lens 310, an overall expanded field of view WF of approximately of approximately 60-80 cm to be covered at high resolution with a single FOVE camera arrangement based on a focal distance FD of approximately 35-40 millimeters. As shown, the FOVE breaks the two fields 910, 912 into two stacked strips each of approximately 600-pixels in height on the imager, which should provide sufficient resolution or adequate decoding of barcode features on a fast moving line.

Figure 11:
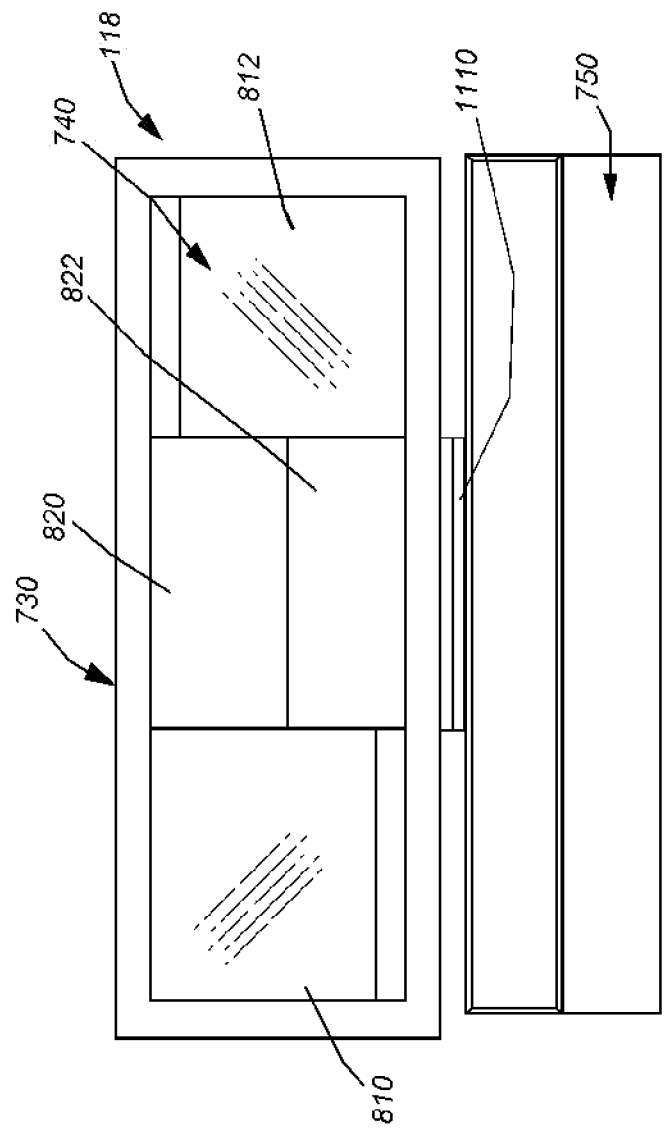
FIG. 11 is a front view of the FOVE of FIG. 7 with bar illuminator arranged on a bracket with respect to the FOVE housing and associated coupling to the camera assembly of FIG. 1.

As shown in FIG. 11, the FOVE assembly allows removable mounting of an accessory bar illuminator 750. The positioning of this illuminator 750 (or multiple illuminators) with respect to the FOVE housing is highly variable in further embodiments. In this embodiment, the illuminator 750 is attached with respect to the bottom side of the FOVE housing 730 on a bracket 1110 that extends forwardly from the coupling 710 (see FIG. 7). The bracket 1110 and bar illuminator can be permanently or removably engaged—for example, using threaded fasteners (not shown) that pass through a top of the bracket 110 and into threaded holes (not shown) on the top side of the illuminator 750. The bracket can be attached to mounting holes on the L-shaped bracket 712. While a bar illuminator is depicted, a variety of alternate illumination types and configurations can be employed. Illuminators can include multiple-wavelength light sources that are selectively operated and/or illumination sources operating at differing intensities, angles or spread. In alternate embodiments, other attachment mechanisms, such as adhesive strips, hook and loop fasteners, screws, etc., can be employed to provide a sturdy and removable mechanical connection between illumination and bracket components. For example, applicant's commonly assigned U.S. patent application Ser. No. 13/645,371, entitled COMPONENT ATTACHED DEVICES AND RELATED SYSTEMS AND METHODS FOR MACHINE VISION SYSTEMS, by Saul Sanz Rodriguez and Laurens Nunnink, filed on Oct. 4, 2012, now U.S. Pat. No. 9,188,839, issued Nov. 17, 2015, is also incorporated herein by reference by way of further background information. This application describes techniques for attaching illuminators and other optical accessories to an FOVE assembly or other vision system structure using magnetic assemblies.

Note that the use of an FOVE as described herein is one option for expanding the FOV so as to provide a wider aspect ration with respect to height. Another option that can be employed in addition to (or substituting) an FOVE is to employ an image sensor constructed with a height/width ratio of (for example) 1:4 or 1:5. Such a ratio could be optimal for applications in which objects moving along a wide line are scanned. Thus, in various embodiments, the sensor used in the camera assembly herein can be selected with a wide aspect ratio in which pixel width is a multiple of pixel height. The illustrative methods and procedures for handling image data can be adapted to process data on a wide sensor—for example, handling different regions of the sensor in differing cores of the processor.

Figure 12:
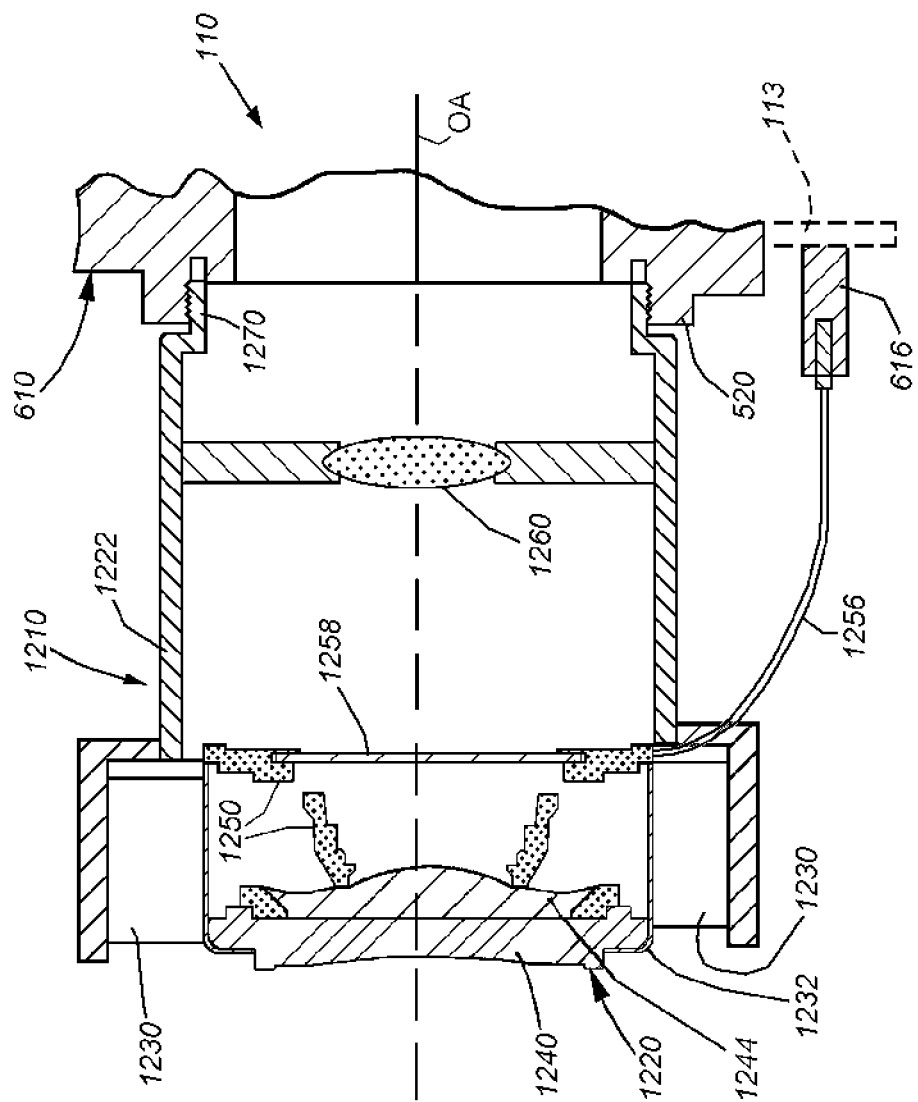
FIG. 12 is a partial top cross section of a membrane-based liquid lens assembly mounted in, and controlled by, the camera assembly of FIG. 1 according to an illustrative embodiment.

Reference is now made to FIG. 12, which depicts an illustrative liquid lens assembly 1210 for use with the camera assembly 110 and associated mounting base 520 according to an embodiment. In this embodiment, the liquid lens unit 1220 (a membrane-based unit, described above) is mounted in a shell 1222 that accommodates the rectangular shape of the lens unit 1220 using a bracket structure 1230. A variety of supporting structures can be employed to secure the lens within the assembly 1210. The liquid lens unit illustratively includes an outer shell 1232 that supports a front offset lens 1240. Behind this offset lens 1240 is mounted the variable, liquid filled membrane lens 1244. This lens varies based upon electromechanical actuation by the actuator assembly 1250. The actuator assembly, temperature sensor and other components are connected to the eight-pin connector 616 by a ribbon cable 1256 that extends from the liquid lens shell 1232 and beyond the lens assembly shell 1222. The routing of cables and/or the sizes/shapes of shells and other components are highly variable. A transparent cover glass 1258 is provided at the rear of the liquid lens unit 1220 to seal it. Received light is transmitted to an appropriate fixed rear lens 1260 supported within the shell 1222. The shell includes a mounting assembly 270 (which can also include a lock ring—not shown) to threadingly secure the lens assembly 1210 to the camera front face 610 at the mount 520. Focusing of the liquid lens assembly 1210 in an auto-focus application is described in further detail below.

While not shown any lens assembly described herein can include various optical filters to attenuate certain wavelengths of light or provide various effects, such as polarization. Likewise illuminators can be provided with various filters. This can allow selective imaging of objects when certain types of illumination are projected and received through filters attuned to such illumination types.

Figure 3:
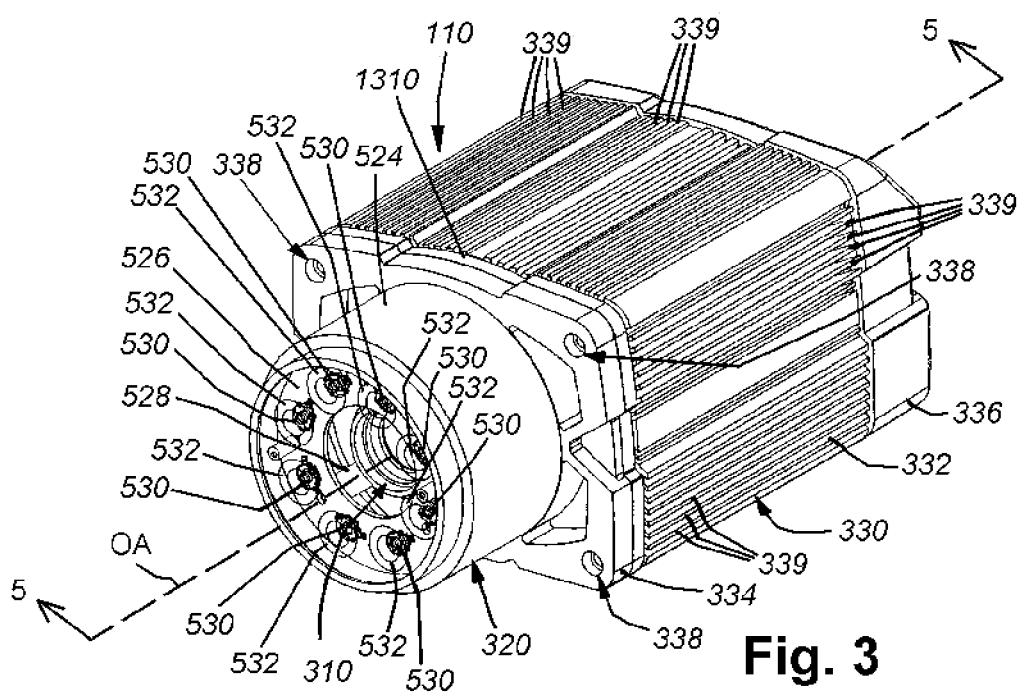
FIG. 3 is a front perspective view of the vision system camera assembly of FIG. 1 according to an illustrative embodiment.
Figure 4:
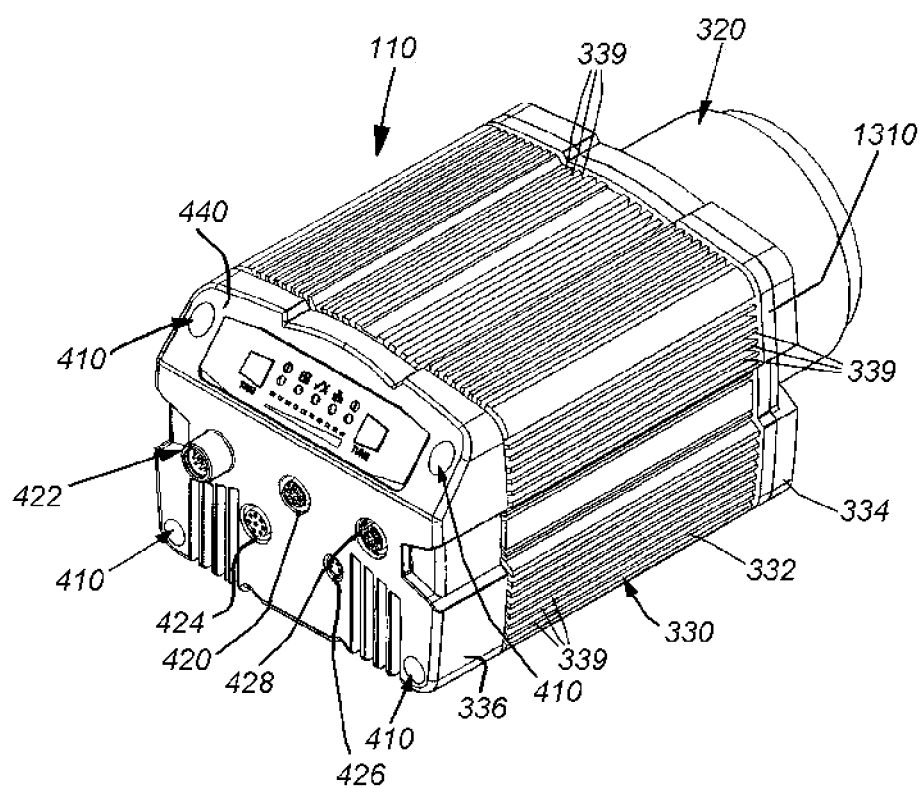
FIG. 4 is a rear perspective view of the vision system camera assembly of FIG. 1 according to an illustrative embodiment.

It should be clear that a variety of optional interfaces and indicators can be provided to the camera assembly according to embodiments herein. Reference is made particularly to FIGS. 3, 4 and 5, and also now to FIG. 13, in which the camera assembly internal components are depicted with the front 334, body shell 332 and rear 336 of the housing removed. The joint between the body 332 and rear 336 includes a ring of translucent material (e.g. acrylic or polycarbonate) 1310 that acts as a light pipe. The translucent ring 1310 can surround some of the perimeter of the joint, or, as depicted, the entire (i.e. a "360-degree indicator") of the perimeter of the joint. The ring 1310 can be completely translucent or translucent over portions thereof. Illustratively, the ring 1310 is illuminated by one of a plurality of differently colored illumination sources (e.g. LEDs not shown) that can be operatively connected with the imager circuit board 113. Light from the LEDs is directed into the ring 1310 by light pipes or other light-transmissive conduits. Depending upon the color and/or timing of the illumination (i.e. one or more colors that flash at a certain rate or pattern), the ring can serve to indicate various operational status. For example, a good ID read and/or decode can illuminated be green, while no (i.e. failed or erroneous) ID read/decode can be illuminated red. Flashing red can indicate a system fault. Other colors, such as yellow, can also be included for various indications. The ring provides a unique and aesthetic, as well as clearly visible, way to indicate a system status. The number of light sources used about the perimeter to illuminate the ring is highly variable and can be provided in accordance with ordinary skill. While the ring 1310 is shown sandwiched between the body 332 and front 334, it is expressly contemplated that a similar ring can be sandwiched between the rear 336 (not shown) and body 332 at the associated joint therebetween using the principles described generally above. Additionally, rings can be provided both at the front and rear joints in various embodiments.

IV. Processing Image Data in the Multi-Core Processor

The illustrative multi-core processor 114 affords a high degree of processing independence with respect to each discrete core (C1, C2). There is provided minimal cross communication between processes absent specific instructions by the user to share data. In general each processor operates its own operating system and loaded programs independently of the other. Memory space for each processor in RAM 244 is generally discrete with minimal shared memory space. An internal bus within the processor provides for the exchange of data between cores, as appropriate based upon the user's programmed instructions. Thus, the process affords the ability to divide image processing tasks so as to increase processing efficiency and speed. The following is a description of various illustrative processes that can be carried out using the dual core functionality of the processor 114.

Figure 14:
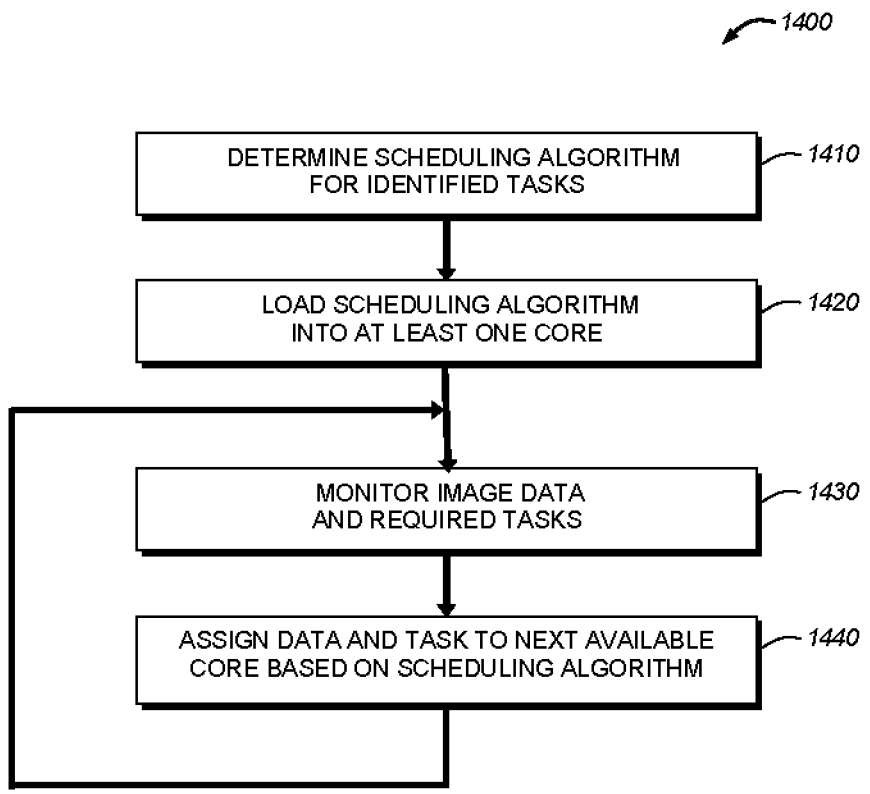
FIG. 14 is a flow diagram of the generalized operation of a scheduling algorithm/process for use in assigning system operation tasks and vision system tasks to cores in the multi-core processor of the vision system of FIG. 1.

Referring to FIG. 14, a generalized procedure 1400 is shown for allowing processors to be dynamically assigned to different tasks that each processor performs. A task can be an operation on a single image frame transferred from the FPGA to the processor. The task can be a vision system task, such as ID finding or an ID decoding task. The process 1400 can allow the operation of the cores in the multi-core processor 114 to be optimized so that cores are used efficiently. That is, if ID finding is less processor intensive than ID decoding, one core can be adapted to find multiple IDs while another is decoding a promising image frame with a found ID. Likewise, where frames represent two halves of an FOVE image, the image can be split between two cores, etc. In general, the program data includes one or more scheduling algorithms that can be adapted to operate most efficiently on a particular set of image data. These scheduling algorithms can assist the processor in predicting when each core will become available for a given task. Appropriate scheduling algorithms are determines in step 1410 of the process 1400 and the algorithm best suited to a particular set of tasks is loaded into at least one core in step 1420. This core becomes the scheduler for the multiple cores and communicates the schedule over the internal bus. As image frames are transmitted from the FPGA over the PCIe bus to the cores of the processor, the frames are monitored, and tasks that are to be performed on the image data are identified by the scheduling algorithm (step 1430). The scheduling algorithm assigns the image data and task to the next available processor (step 1440). This assignment can be based on an advance estimate of when the processor becomes available. As tasks are completed on particular image frames the scheduling algorithm continually monitors and assigns new tasks and data to cores. The scheduling algorithm can be adapted over time to monitor observed results with differing types of tasks and optimize the prioritization of tasks in each core. One core has scheduling algorithm that defines which core receives a task.

It should be noted that the use of two cores C1 and C2 in the illustrative embodiment is exemplary of a multi-core processor that can contain three or more cores. The processes described herein can be adapted to scale readily to three or more cores.

Figure 15:
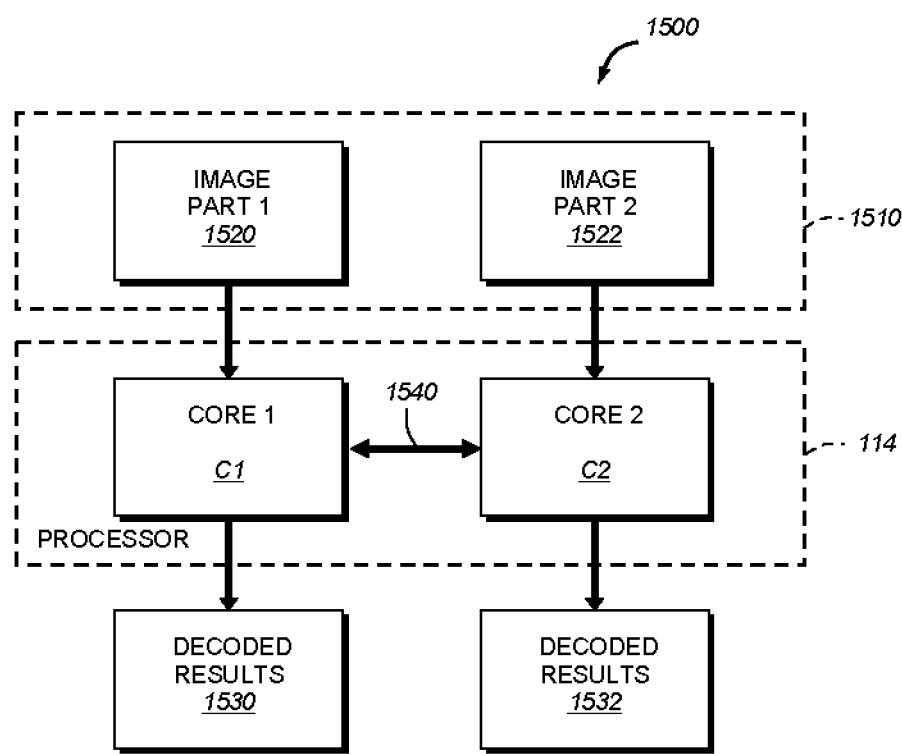
FIG. 15 is a block diagram showing a multi-core process in which an image frame is divided into multiple parts that are assigned to be processed in multiple cores, respectively.

The following is a description of further processes using the multi-core processor according to embodiments:

With reference to the schematic representation of FIG. 15, a multi-core process 1500 is shown in which the processor 114 receives an image frame 1510 in two parts 1520, 1522. The parts can be divided vertically (e.g. the two fields of view provided by the FOVE), horizontally or according to another division (e.g. alternating pixels). The two (or more) image parts 1520, 1522 are transferred to each core C1 and C2. The two (or more) partial images are each processed and decoded in parallel by their respective core C1, C2. Decoded results 1530, 1532 can be combined and are provided to downstream processes, such as the indication of a good or no ID read and transmission of the decoded information to a remote computer. In general, an overlap between the two partial images can be provided so that IDs falling between images are adequately identified in at least one core. The overlap can vary, but is generally large enough to appropriately include an ID of a given size in at least one of the partial images. Where the image is divided by the processor itself, the overlap is provided by transmitting overlapping image data to both cores. In the case of the FOVE, the overlap exists in the acquired image and the image of each field of view can be transmitted to each core with no additional provision of overlap. Communication between cores (bus link 1540) allows combination of results and other needed cross-core communication.

In a further embodiment, the process 1500 can be substituted with a stitching process for cases in which there is little or no overlap between images (i.e. a plurality of FOVE images that are substantially free of overlap). Thus, in this embodiment each of the FOVE images, potentially contains part (but not all) of an exemplary ID feature set, and both images collectively contain the substantially entire ID feature set. One or more of the cores is employed to identify the interconnections between the ID fragment in each image and "stitch together" a complete ID. This can occur during the ID finding stage of the process (wherein the complete ID is assembled and then decoded by one or more cores, or during the decoding process—i.e. the process decodes part of the overall ID in each image and attempts to merge the results of each separate decoding.

Note, while each of the multi-core processes described herein is shown using discrete cores to perform discrete processes, it is expressly contemplated that the term "core" as used herein can broadly refer to a set of cores. Thus, where a quad core processor is employed a set of two cores can be responsible for one process task, while a second set of two cores can be responsible for another process task. Alternatively, a set of three cores can be responsible for one (higher-processing-overhead) task, while a single core can be responsible for a different (lower-processing-overhead) task. Alternatively, there simultaneous tasks or four simultaneous tasks can be carried out by assigning appropriate processor cores and/or sets of cores to tasks. The scheduling algorithm can also be programmed to dynamically reassign cores to different tasks depending on the current processing needs of a given task. The appropriate level of processing power (i.e. cores) needed for a give task can be determined by experimentation, operating on different types of tasks and observing the speed in which different numbers of processors complete such tasks. This process is described further below.

Figure 16:
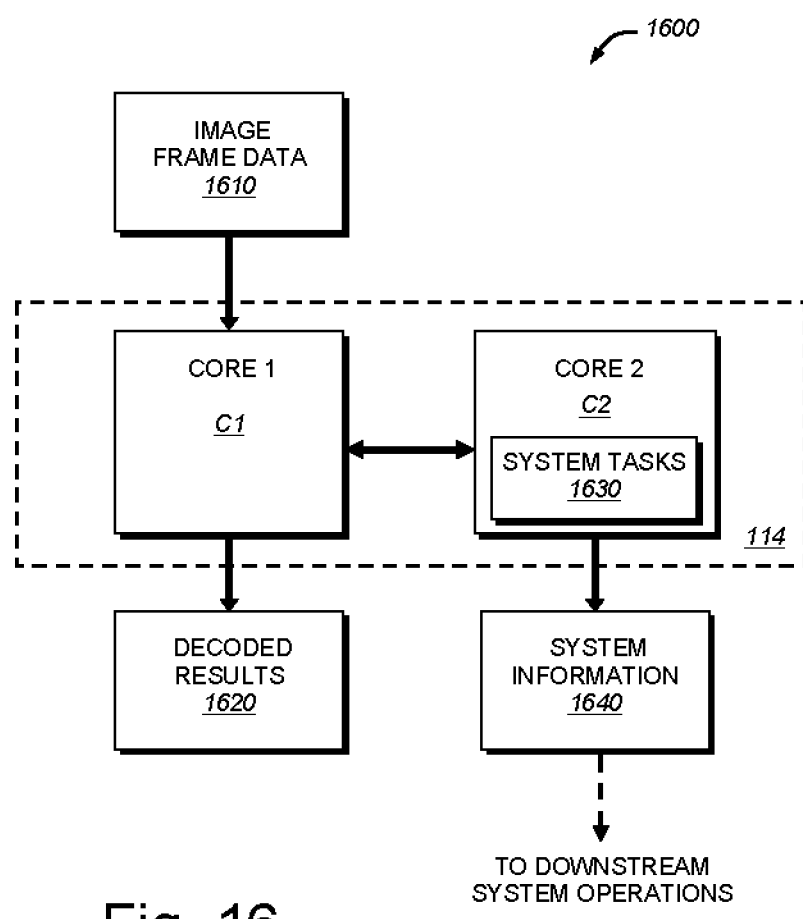
FIG. 16 is a block diagram showing a multi-core process in which an image frame is assigned to be processed in one core, while another core performs one or more system tasks.
Figure 17:
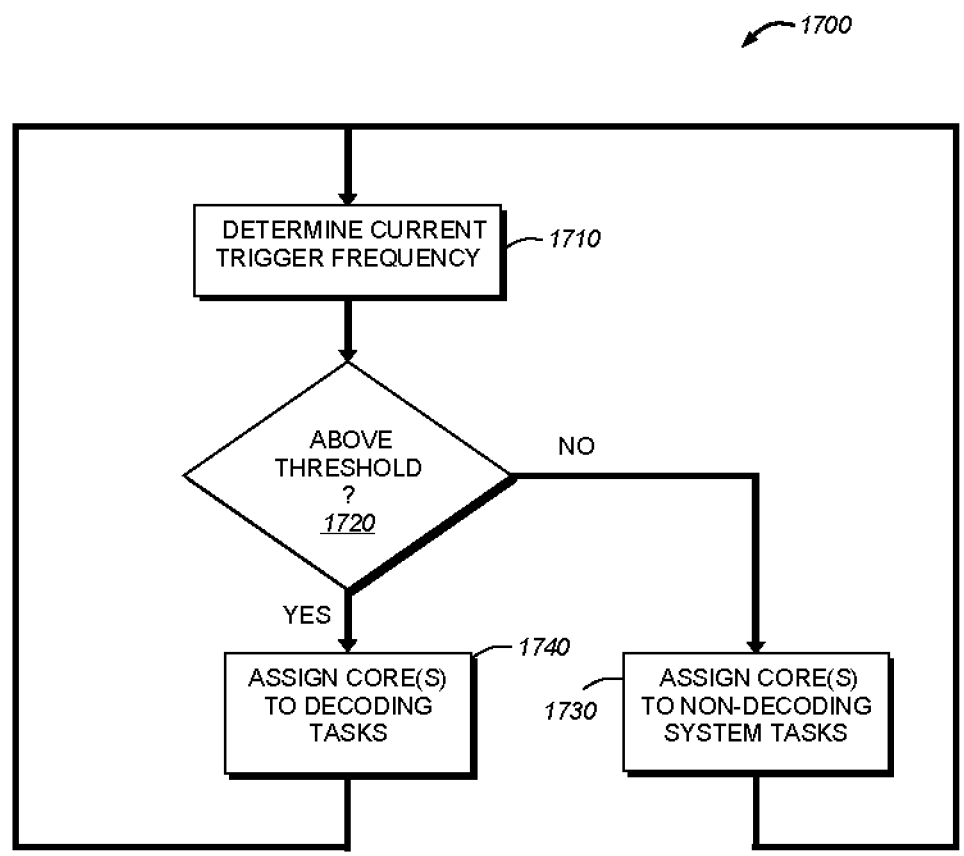
FIG. 17 is a flow diagram showing the dynamic assignment of cores to image processing and non-image processing system tasks based upon current trigger frequency.

With reference to the schematic representation of FIG. 16, a multi-core process 1600 is shown in which the processor 114 receives an image frame 1610 at one (set of) core(s) C1, which performs ID decoding to output decoded results 1620. The second (set of) core(s) C2, conversely, performs one or more (non-decoding) system-related tasks 1630 that support image acquisition and other system operations by providing output information 1640 used in further downstream tasks. Such system tasks 1630 can include (but is not limited to):

Focus setting algorithms (including measuring distance/calibration and calculating sharpness) and auto-brightness (which can include exposure, gain and illumination intensity) algorithms;

JPEG (or other) image data compression—for example performed on image frames that are saved and/or transmitted to a remote computer; and/or Wave Front reconstruction—used for example in a vision system that uses known Wave Front coding techniques to increase the depth of focus.

Where the system uses one or more cores to perform non-decoding, system tasks (i.e. process 1600 in FIG. 16), the assignment of certain cores to system tasks can be dependent upon the current trigger frequency. As shown in FIG. 17, a scheduling process 1700 determines the current trigger frequency in step 1710. If the trigger frequency is below a certain threshold, thereby allowing fewer cores to carry out needed decoding tasks, decision step 1720 assigns one or more cores to non-decoding tasks (step 1730). Conversely, at trigger frequencies above a certain threshold (or multiple thresholds) one or more cores (the number of cores being potentially dependent on the frequency) are assigned to decoding tasks (step 1740). In a simplified dual-core embodiment as shown, at a low trigger frequency one core is assigned to decoding and another to system tasks. At a higher trigger frequency one core (e.g. C1) is assigned to decoding, while the one or more other core(s) (e.g. C2) can perform both decoding and system tasks. This is particularly applicable in a dual-core system. Where more than two cores are employed in an illustrative multi-core system, one or more cores can be assigned to decoding while the other core(s) are assigned to both decoding and system tasks.

Figure 18:
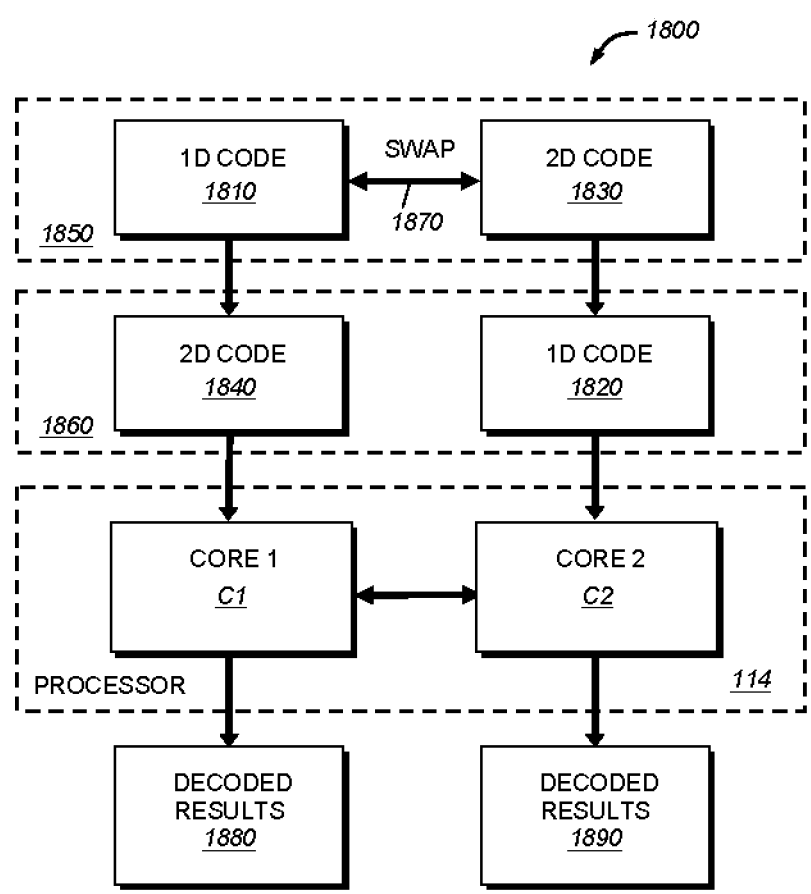
FIG. 18 is a block diagram showing a multi-core process in which IDs/codes in each image frame are dynamically assigned to cores in a manner that more efficiently balances the processing load across the group of cores.

FIG. 18 schematically depicts a process 1800 for employing multiple cores in the presence of both 1D codes and 2D codes (or other discrete types of features which require different processing power/time to decode). In general 2D codes require more processing resources/time to fully decode. Once IDs in an image are found they are scheduled so that the tasks of each core C1 and C2 are dynamically load-balanced to optimize the throughput of the system. For example, two 1D codes 1810 and 1820 are shown in two respective images 185 and 1860. Likewise two 2D codes 1830 and 1840 or shown in each respective image. The codes are organized so that 2D and 1D decoding tasks can be swapped (double arrow 1870) between the two cores at every next image. In this manner, on average each core C1, C2 generates a similar throughput of decoded results 1880, 1890.

Figure 19:
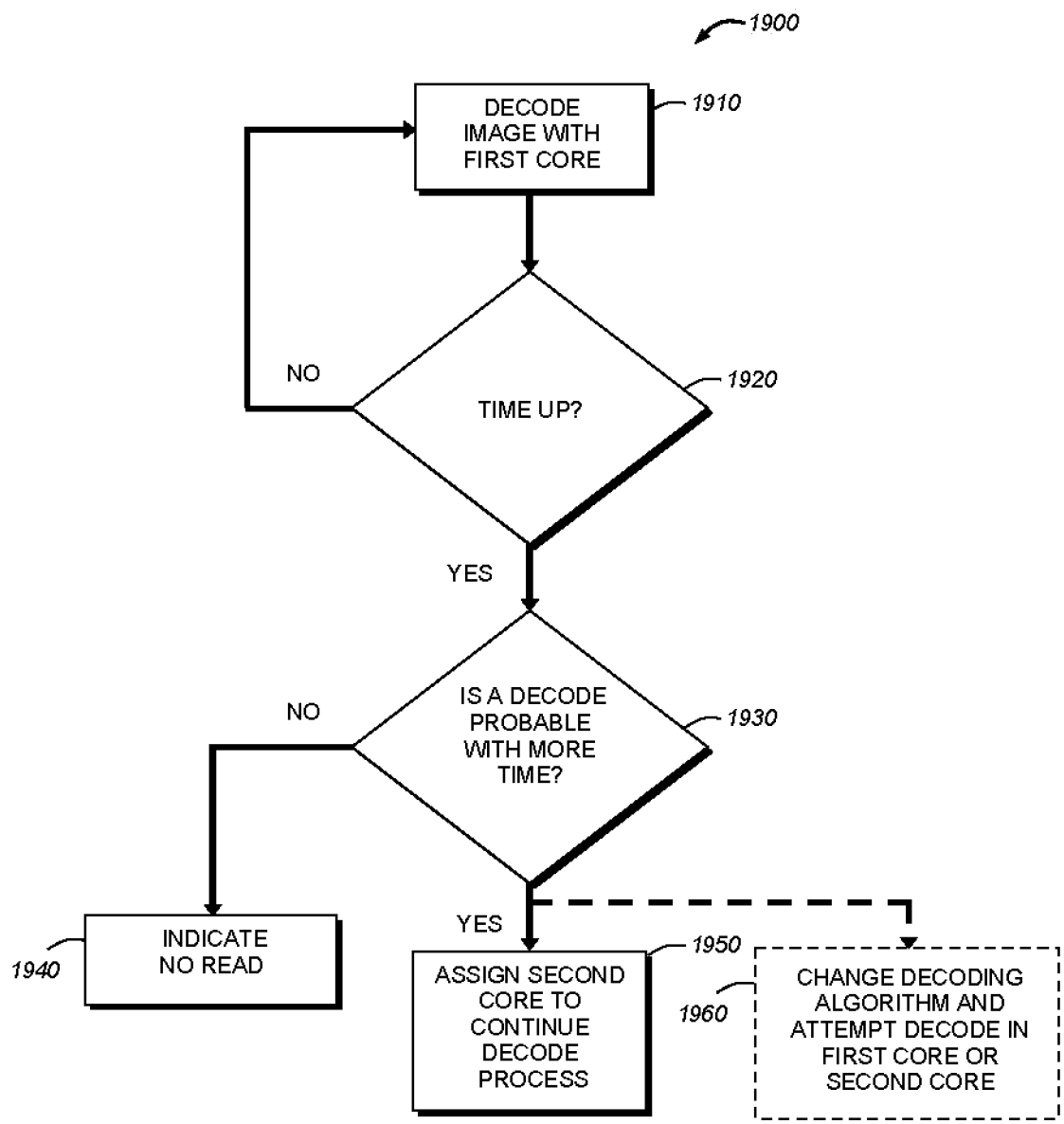
FIG. 19 is a flow diagram showing the assignment of a second core to an ID/code decoding process after processing by the first core has exceeded a predetermined time limit.

A multi-core process 1900 shown in FIG. 19 assigns a first (set of) core(s) to decode the image (step 1910) within a maximum time determined by the highest throughput through the system. If the maximum time is exceeded without a complete decode, decision step 1920 then braches to decision step 1930, which determines whether it is probable the image can be decoded if given more processing time than the maximum time. If not, then the system indicates no read (step 1940). If decoding is probable, then a second (set of) core(s) is assigned in step 1950 to attempt further decoding on the one or more images that could not be decoded within this maximum time (but have characteristics that make it probable can be decoded with more processing time). In an operational example characteristics that would make it probable that an image can be decoded given more time include: (a) the finder pattern of the code has already been located in the image; and/or (b) other codes from a set of codes that have been printed on the object have already been found (e.g. Maxicode and barcode printed on the same package and one has already been found). Optionally, if it is probable or possible that an ID can be decoded with more time (or by use of one or more differing algorithm(s) that that currently employed, then the decision step 1930 can branch (shown in phantom) to step 1960 in which the system directs either the first core or, the newly assigned, second core to continue processing the ID using a different decoding algorithm. This algorithm can be selected by default or based upon certain characteristics in the image and/or ID features (e.g. apparent image contrast, etc.) that render such algorithm particularly suited to deal with such characteristics.

Figure 20:
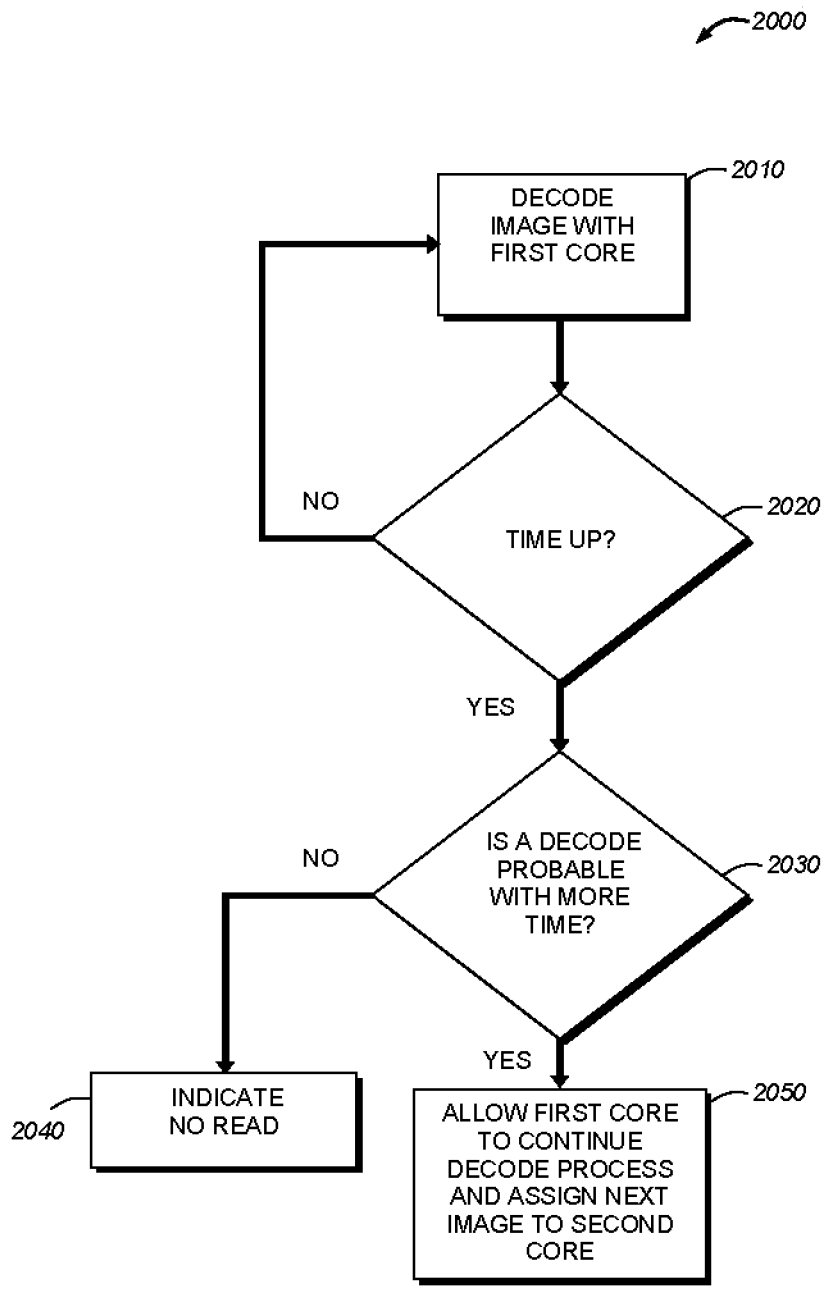
FIG. 20 is a flow diagram showing the continued assignment of a first core to an ID/code decoding process after processing by the first core has exceeded a predetermined time limit.

A variation of the process 1900 of FIG. 19 is shown in FIG. 20. In the depicted process 2000 the maximum decoding time on a given image has been reached (steps 2010 and 2020). Assuming that characteristics indicate a probable decode given more processing time (otherwise no read is indicated in step 2040), the system allows the first (set of) core(s) to continue processing the image and decoding of the next image is assigned to a different (set of) core(s), to enable the first (set of) core(s) to complete its decoding task (step 2050).

Figure 21:
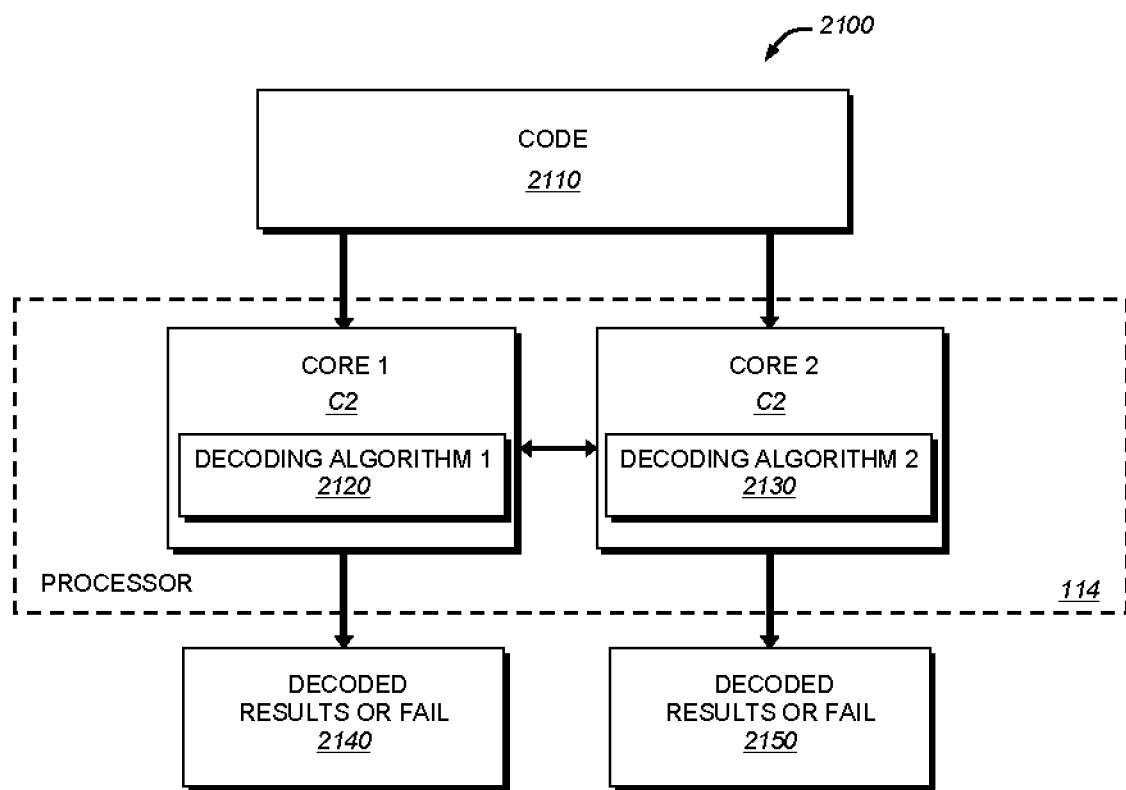
FIG. 21 is a block diagram showing a multi-core process in which an ID/code in an image frame is concurrently assigned to two cores that each perform different decoding algorithms thereon.

A multi-core process 2100, shown in FIG. 21 is used to attempt to decode an ID/code 2110 in an image using multiple decoding algorithms. The first (set of) core(s) C1 attempts to decode the ID/code 2110 with a first decoding algorithm 2120, and the second (set of) core(s) C2 concurrently (when available) attempts to decode the same ID/code 2110 with a second decoding algorithm 2130. For example, one core C1 attempts to decode the image with an algorithm that has been optimized for datamatrix codes with high contrast, and the other core C2 employs an algorithm optimized of low contrast (DPM) codes. The results or failure to decode 2140, 2150 are output from each core (or set of cores) C1, C2. Note that in certain instances the two set of results from different algorithms can be combined to "stitch together" a complete code or otherwise validate the decoding task. This can occur where neither result is a complete (or reliable) read of the ID/code.

Figure 22:
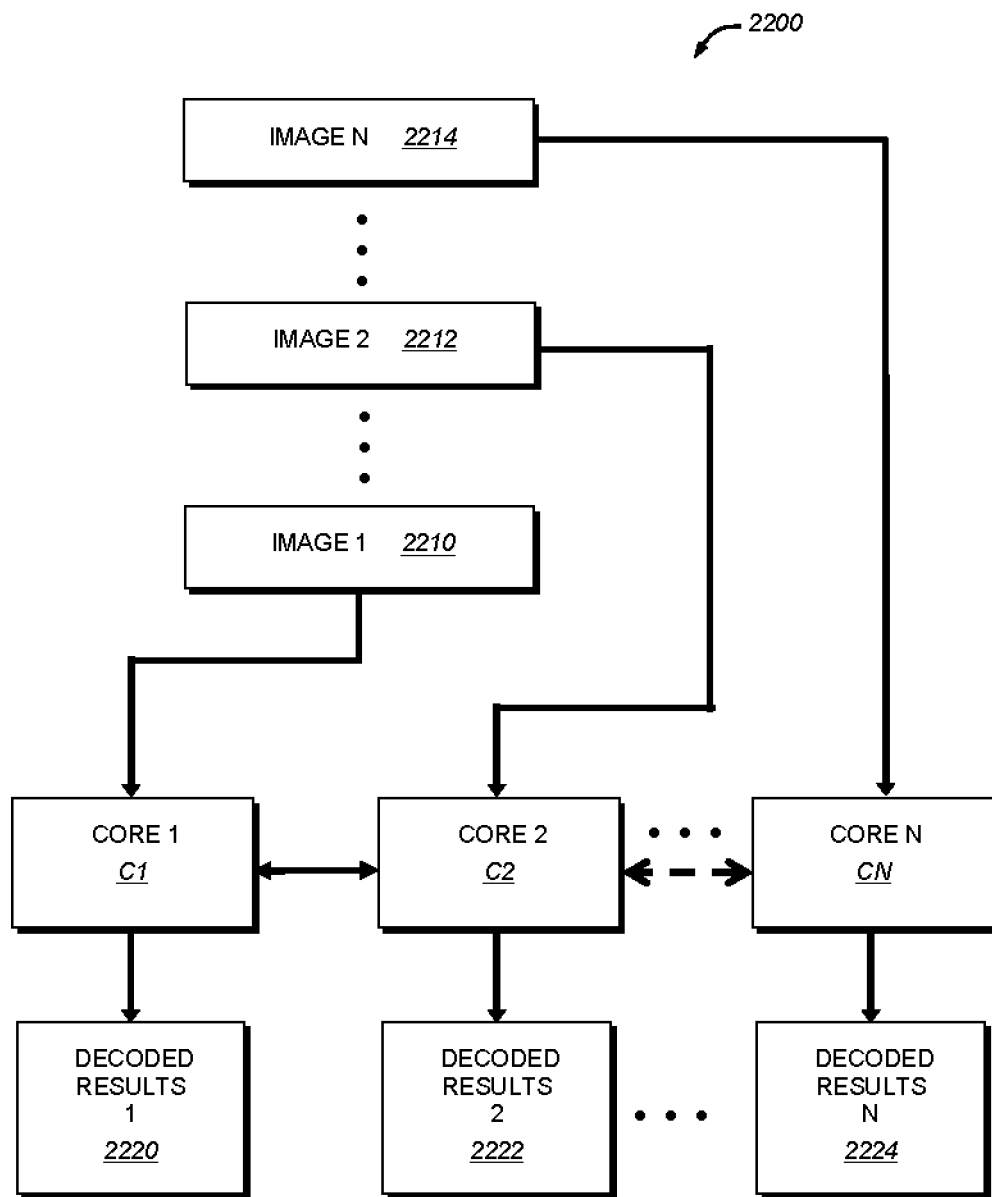
FIG. 22 is a block diagram showing a multi-core process in which a succession of image frames are each assigned to different cores for processing thereby.

Another multi-core process 2200, employing Core 1 (C1) to Core N (CN), is shown in FIG. 22. In this process sequential images 1-N (2210, 2212, 2214) are decoded using a (set of) core(s) for each image. Each core C1-CN produces decoded results 1-N (2220, 2222, 2224), respectively. As described above cores can be assigned to images in the sequence based upon a predetermined sequence or based upon a dynamic determination. Where dynamic assignment is employed (as described above) various factors can be taken into account such as type of codes and speed of decoding a given image (i.e. does decoding time exceed a maximum threshold).

Figure 23:
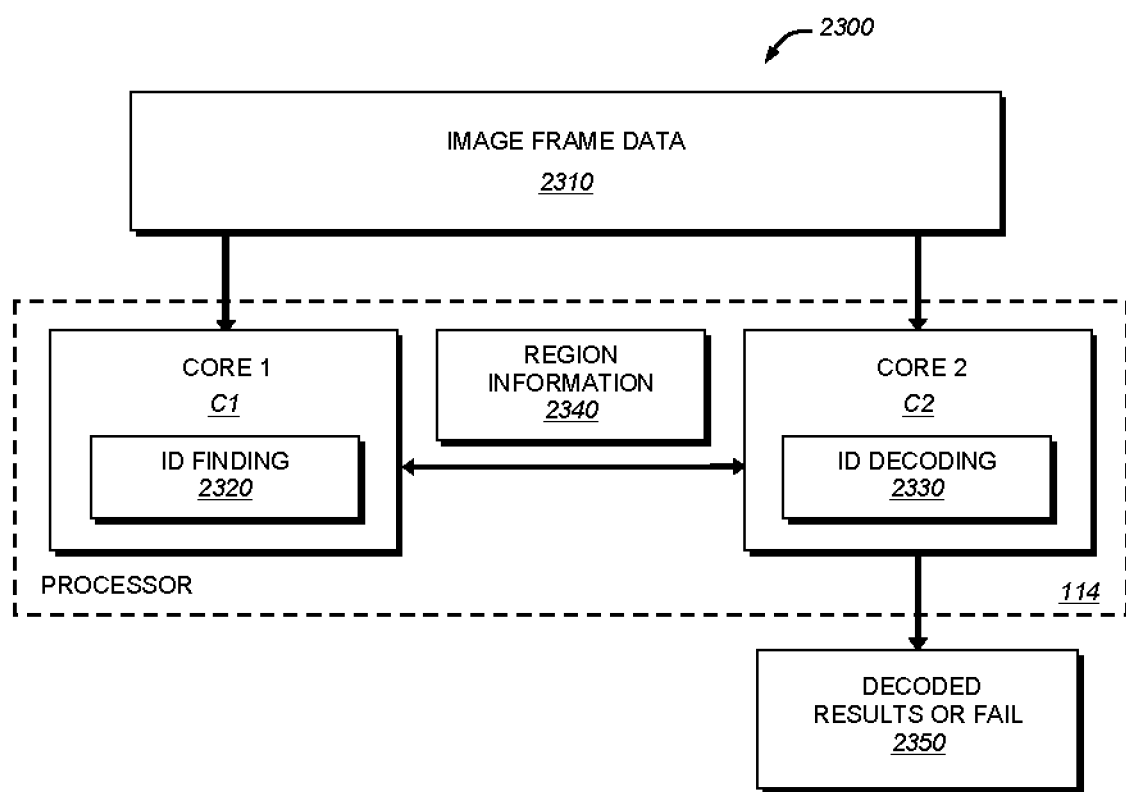
FIG. 23 is a block diagram showing a multi-core process in which image frame data is concurrently assigned to a first core running an ID/code finding process and a second core running a ID/code decoding process based on found IDs/code information provided by the first core.

FIG. 23 depicts a multi-core process 2300 in which ID-containing regions are located by one (set of) core(s) and IDs are decoded in those regions in another (set of) core(s). The image frame data 2310 is transmitted to both cores C1 and C2. One core C1 operates a process 2320 for finding regions containing symbol (ID)-like information, while the other core C2 operates an ID-decoding process that uses region information 2340 (typically passed between cores over the internal bus) to focus on ID-like information and transmitted ID characteristics (e.g. barcode orientation, boundaries, etc.) in those regions to speed the decoding process and efficiently generate decoded results 2350 Where more than two cores are used, a smaller number of cores can be applied to finding and a larger number can be applied to decoding (or vice versa).

Figure 24:
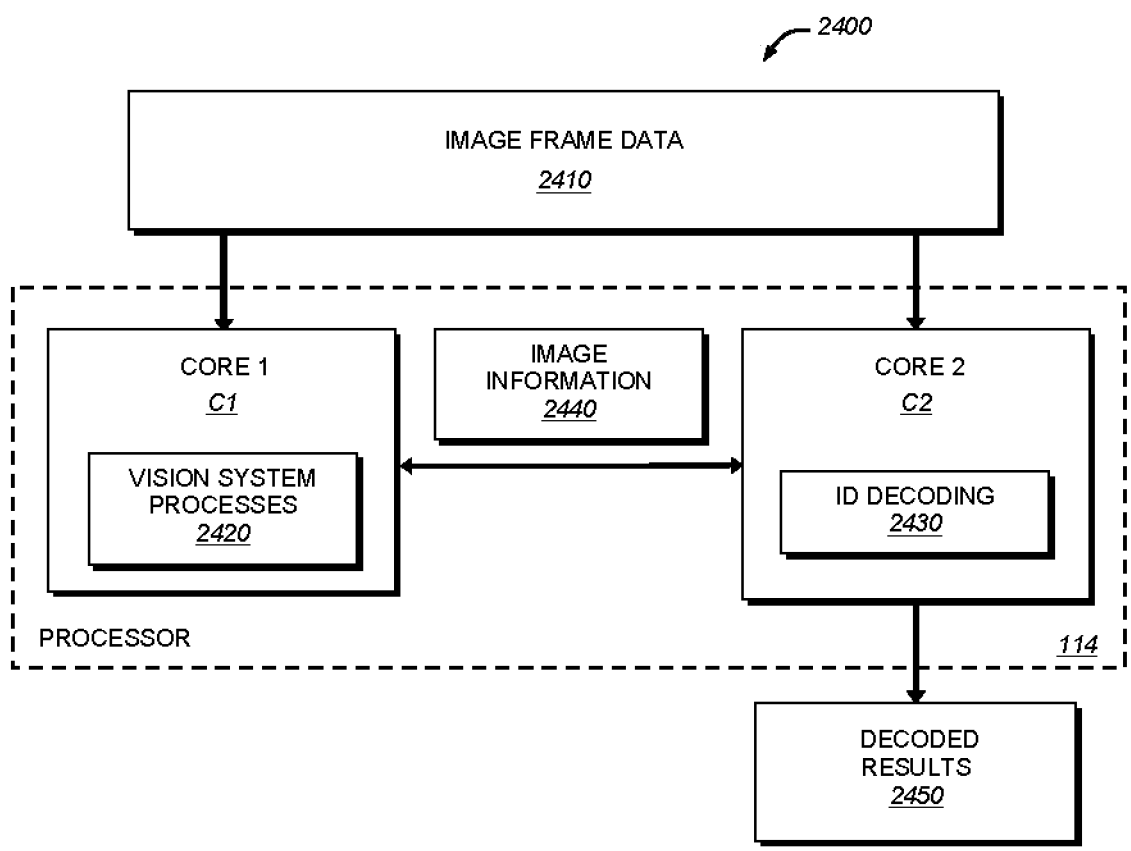
FIG. 24 is a block diagram showing a multi-core process in which image frame data is concurrently assigned to a first core running a vision system process and a second core running a ID/code decoding process based on image information provided by the first core.

The multi-core process 2400 depicted in FIG. 24. In this embodiment, a first (set of) core(s) C1 processes the image frame data 2410 using various conventional and/or purpose-built vision system tools 2420 to extract relevant image information (e.g. edges, sub-sampled pixels, blobs, etc.). The extracted image information 2440 is passed over the bus to the second (set of) core(s) C2 for decoding by the decoding process 2430, which includes processes for interpreting the extracted information to focus upon ID-like features. This yields decoded results 2450 (if any).

Figure 25:
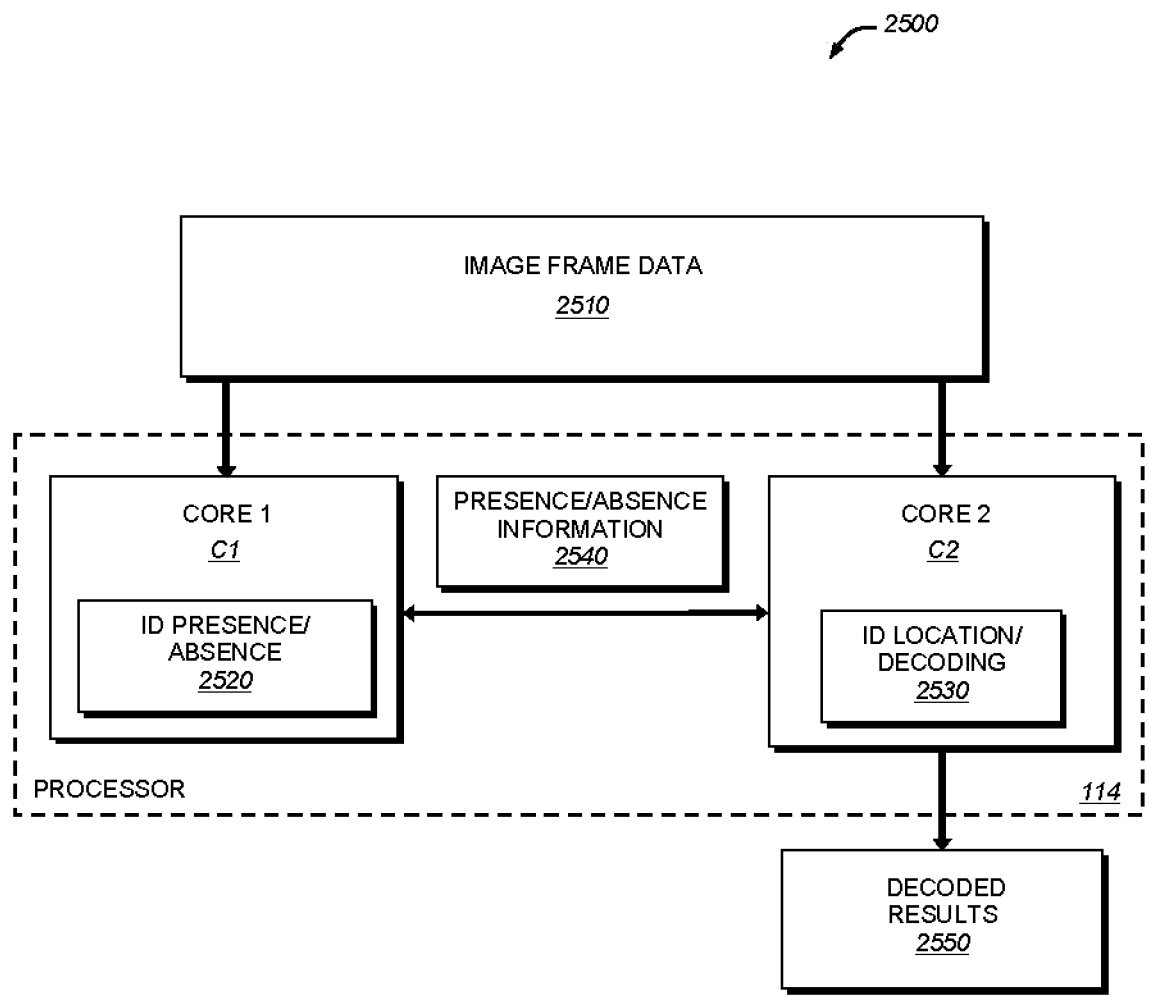
FIG. 25 is a block diagram showing a multi-core process in which image frame data is concurrently assigned to a first core running an ID/code presence/absence process and a second core running a ID/code location and decoding process based on ID/code presence/absence information provided by the first core.

A similar multi-core process 2500 to the processes 2300 and 2400 is depicted in FIG. 25. A first (set of) core(s) C1 employs an ID presence/absence process 2520 (e.g. adapted to search for occurrences ID-like features, such as closely arranged parallel lines, and/or datamatrix geometries in the image data) in the transmitted image frame data 2510 in order to determine the presence/absence of an ID/code. This differs for position, location or image feature information in that the actual presence or absence is exclusively determined. This determines if the image likely contains an ID/code or should be discarded without (free of) further processing. The presence/absence information 2540 is transmitted to the second (set of) core(s) C2. This is used in the second core to either perform the process 2530 or discard the image data. If a code/ID is indicated as present, the second (set of) core(s) C2 employs ID location and decoding process(es) 2530 to find and decode images with sufficient likelihood of a symbol present. Any decoded results 2550 are output upon completion of the decoding process. In addition to (or instead of) ID location data, this and other processes described herein can transfer other data relevant to the ID between cores. Such other data can include, but is not limited to, image resolution, ID type, etc.

Figure 26:
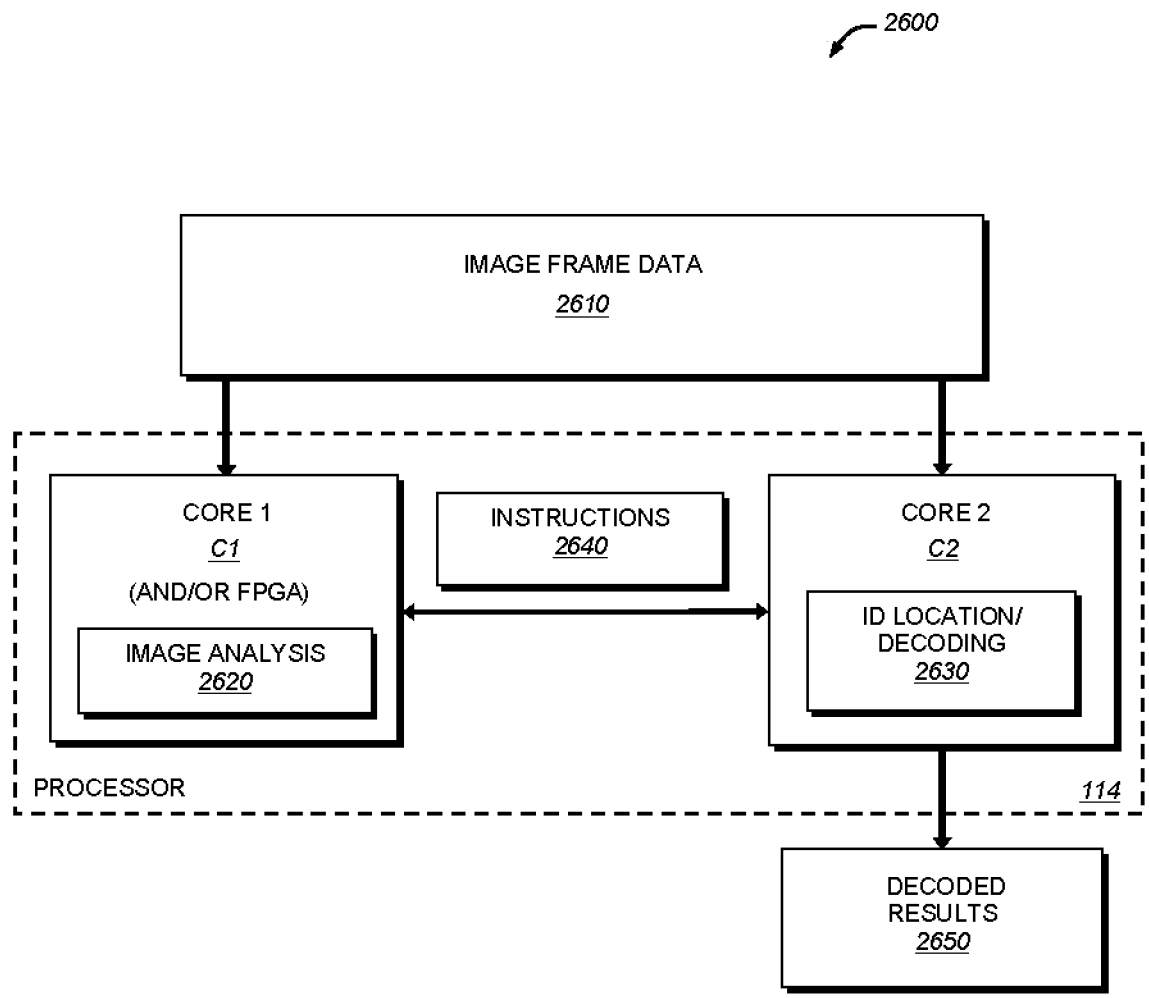
FIG. 26 is a block diagram showing a multi-core process in which image frame data is concurrently assigned to a first core running an image analysis process and a second core running a ID/code location and decoding process based on information related to the quality and features of the image frame provided by the first core.

A further variation on the multi-core processes 2300, 2400 and 2500 is depicted in the process 2600 of FIG. 26. In this embodiment, the first (set of) core(s) C2 analyzes the data of each image frame 2610 to determine whether the image is sufficient in its quality and/or content to be processed by the second (set of) core(s) C2. A image analysis process 2620 determines image characteristics and decides if performing an ID finding and decoding process is worthwhile. If so, the first (set of) core(s) C1 instructs (transmitting instructions 2640) the second (set of) core(s) to undertake the ID finding/location and decoding process 2630 from which decoded results 2650 are output. Possible characteristics that are used to determine the sufficiency of the image data include, but are not limited to, image contrast, sharpness/focal quality, etc. As shown, it is also expressly contemplated that the image analysis process 2620 can be operated at least in part within the FPGA using predetermined algorithms adapted to run within the FPGA. Information derived from the algorithm is then transferred to one or more cores (e.g. C1, C2, etc.), and the information is used in ID location and decoding according to the process 2630.

It should be clear that any of the above-described multi-core processes can be combined with other multi-core process by the scheduling algorithm in a single runtime operation. For example, auto-focus can be run as a system task in one core (process 1600 in FIG. 16 for a portion of the image acquisition of an object, while the processing of partial images (e.g. two parts of the FOVE image) can be performed during a subsequent portion of that image acquisition event. Other processes described above can also be performed during other portions of the acquisition event as appropriate.

V. Additional System Features and Functions

Having described various illustrative embodiments of the electronics, physical package and multi-core process of the vision system herein, the following is a description of further illustrative features and functions that can be desirably and advantageously employed to enhance overall operation and versatility.

Figure 27:
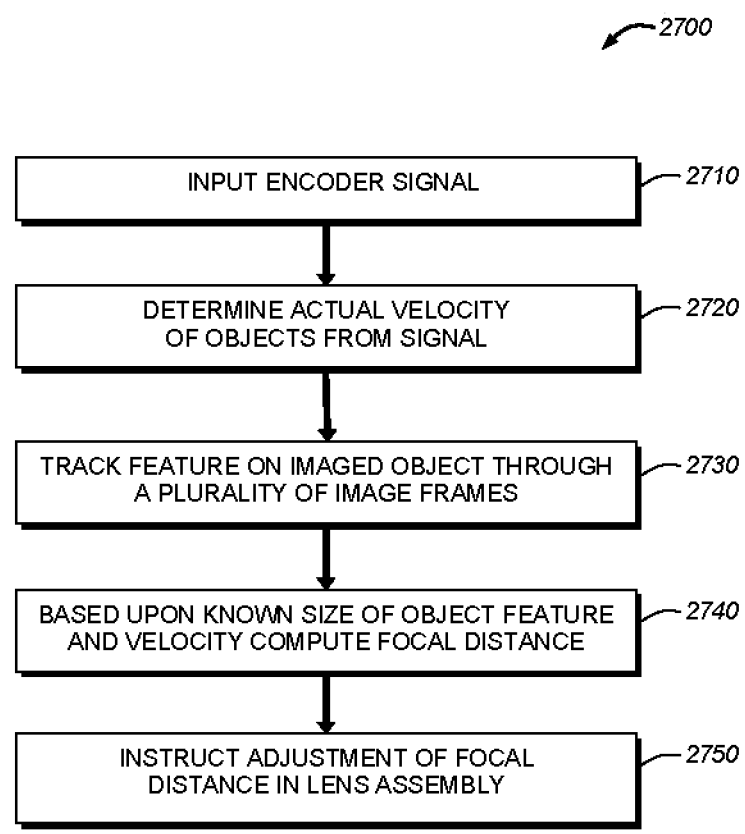
FIG. 27 is a flow diagram showing a system process for adjusting focal distance based upon comparative measurements from a conveyor/line speed sensor (encoder) and the tracking of features on objects passing through the field of view of the illustrative vision system.

Determination of focal distance and rapid adjustment of the lens assembly is typically desirable on an object-by-object basis, particularly where the height and/or orientation of objects varies (as shown in the example of FIG. 1). In general, conveyor systems and other moving lines are adapted to include an encoder signal in the form of a movement-distance-based pulse, the period of which varies with line speed. By knowing the movement-distance increment between pulses, the velocity of the line (and objects thereon) can be readily determined at any point in time. Thus, with reference to the process 2700 of FIG. 27, an encoder signal is input to the interface of the camera assembly (step 2710) and processed to determine actual object velocity (step 2720). When features (e.g. IDs or other discernable shapes) on the object are identified, their pixel shift can be tracked between image frames (step 2730). The time between frames is known, and thus, the movement of pixels in features between frames allows the system to compute relative focal distance to the object (feature). With the depicted diverging camera lens, pixel shift increases at shorter distances and decreases at longer distance. Thus, the measured pixel shift allows the computation of focal distance using basic equations (step 2740). When the focal distance is computed, the system can direct the FPGA to appropriately adjust the liquid lens assembly (or other auto-focus lens) (step 2750). In general, a stored table of current values corresponds with predetermined focal distances. Upon knowing the distance, the system sets the current to that value. Calibration of the lens assembly to ensure that the settings of current match the determined focal distance can be performed periodically using conventional or customized techniques. In an illustrative embodiment, the known distance to a conveyor can be used to calibrate the focal distance of the liquid lens. A feature on the conveyor belt (or an applied fiducial) is brought into sharp focus by the lens, and this is set to the known focal distance. This feature can be fixed (e.g. located along the side of the conveyor, within the field of view, or can be on the moving belt. Where it is located on the moving belt, it can optionally be indexed to an encoder position so that the calibration feature's relatively precise position (in the downstream direction) within the field of view is known.

Figure 28:
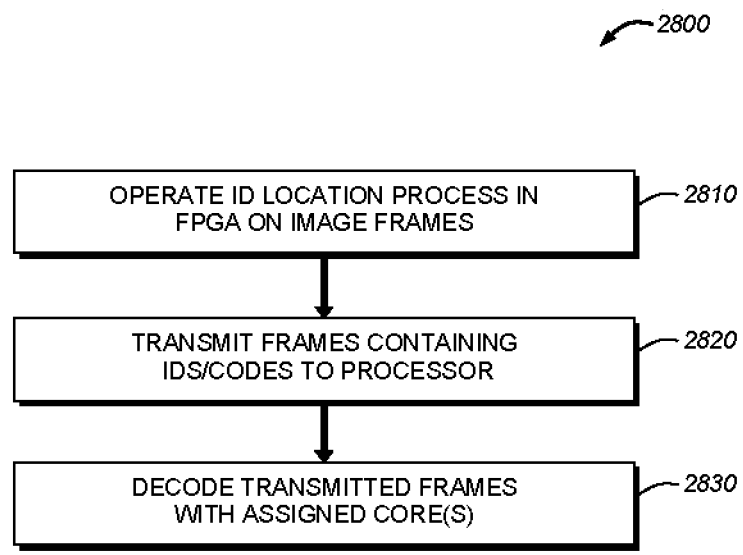
FIG. 28 is a flow diagram showing a process for locating features of interest (IDs/codes) using the imager-connected pre-processor (FPGA) and transmitting exclusively image frames that appear to contain features of interest to the multi-core processor for further processing.

With reference to the process 2800 in FIG. 28, the FPGA (or other imager-connected pre-processor) can include a program or process that performs a high-speed search for ID/Code-like features (step 2810). This process can use standard ID-finding procedures, such as a search for multiple adjacent parallel lines or a datamatrix-like pattern of edges. The FPGA only transmits image frames from the buffer (memory 228) that contain such features over the PCIe bus to the processor 114 (step 2820), essentially weeding-out non-code containing image frames. The processor then performs further decoding processes on the received image frames using assigned core(s) (step 2830). The FPGA can also transmit relevant ID location data if available to shorten decoding time within the processor 114.

Figure 29:
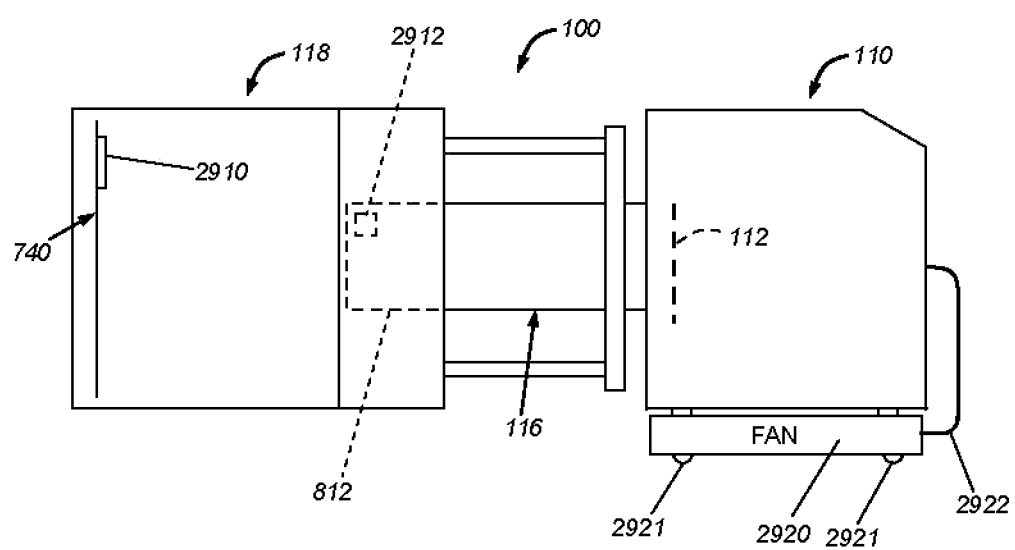
FIG. 29 is a side view of the vision system of FIG. 1 showing a self-calibration fiducial provided to the FOVE and an optional bottom-mounted cooling fan on the vision system camera assembly.

With reference to FIG. 29, the vision system 100 is shown with camera assembly 110, lens assembly/shroud 116 and attached FOVE 118. The FOVE has been provided with one or more applied fiducials 2910 that can comprise a checkerboard of light and dark elements or another clearly discernable pattern. In this embodiment the fiducial 2910 is applied to a corner of the FOVE window 740 in a location that is relatively small and remote with respect to the overall field of view (e.g. at a corner). Alternatively (or in addition), the fiducial 2912 (shown in phantom) can be placed on a mirror (for example, large mirror 812—shown in phantom) in an appropriate location. In general, the fiducial is placed on an optical component along the optical path of the FOVE. The distance between the fiducial and image plane (sensor 112—shown in phantom) can be accurately determined and by focusing on the fiducial, the focal distance of the liquid lens (or other lens assembly) can be accurately calibrated. Additional techniques for providing "closed loop" auto-calibration to a liquid lens (or other variable lens assembly) are shown and described in commonly assigned U.S. patent application Ser. No. 13/563,499, entitled SYSTEM AND METHOD FOR DETERMINING AND CONTROLLING FOCAL DISTANCE IN A VISION SYSTEM CAMERA, by Laurens Nunnink, et al., filed on Jul. 31, 2012, now U.S. Pat. No. 8,576,390, issued on Nov. 5, 2013, the teachings of which are incorporated herein by reference as useful background information. In general, the structures and techniques described in this incorporated application entail providing a structure to the lens assembly that selectively projects a fiducial pattern into at least a portion of the optical path during calibration (which can occur on-the-fly during runtime operation), but allows some or all of the field of view to remain free of interference while acquiring object images in normal runtime operation. This approach generally eliminates inaccuracies due to production tolerances and calibration drift over age and temperature of the system and/or lens assembly.

For purposes of further illustration in FIG. 29 the above-described optional fan assembly 2920 is shown mounted by screws or other fasteners 2921 to the bottom side of the camera assembly 110. A connecting cable 2922 is connected to an appropriate connector on the rear of the camera assembly. Alternatively, the cable 2922 can be connected to an external power source.

Figure 29A:
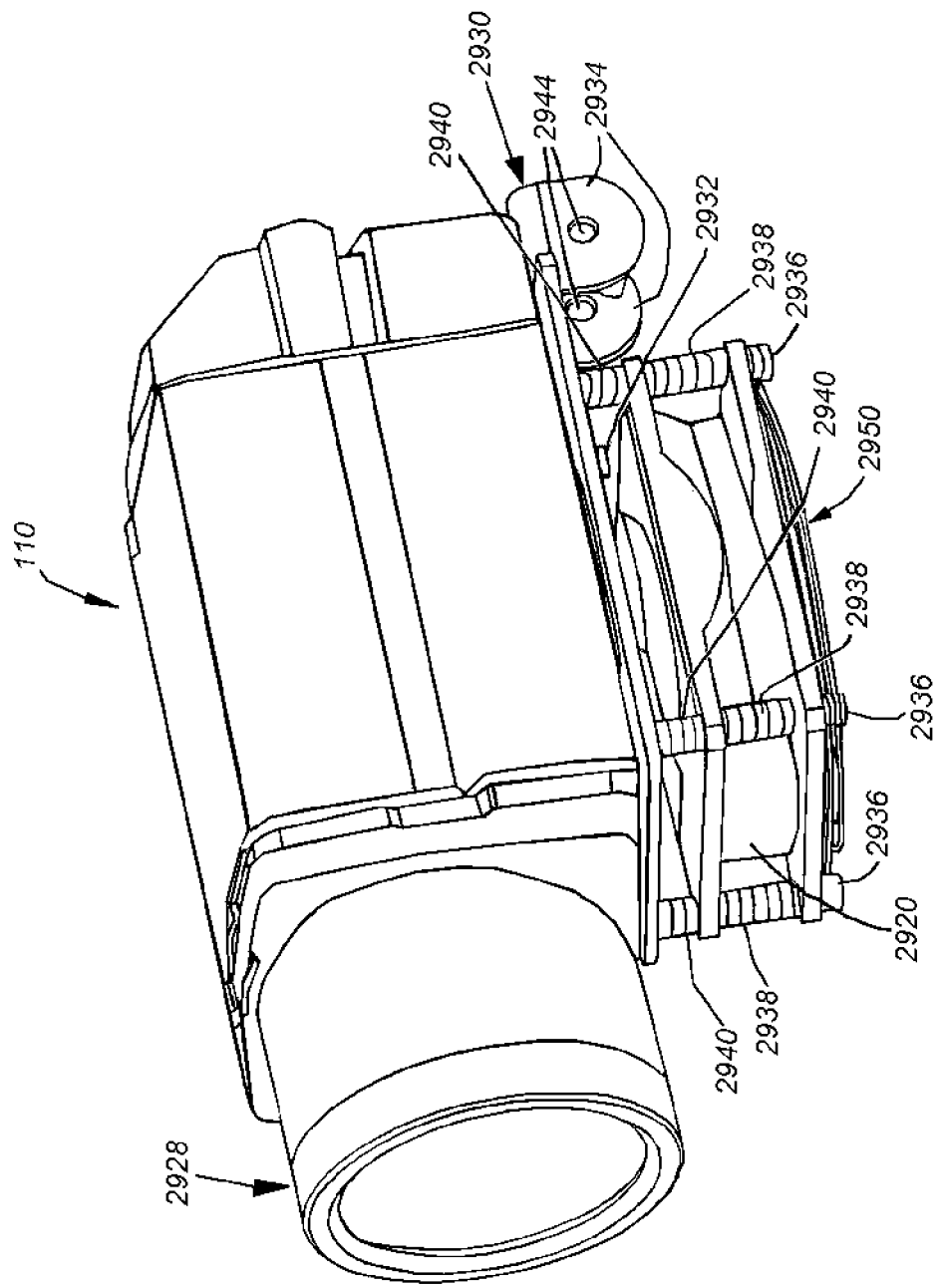
FIG. 29A is a more detailed perspective view of the camera assembly including a bottom-mounted bracket and cooling fan according to an illustrative embodiment.
Figure 29B:
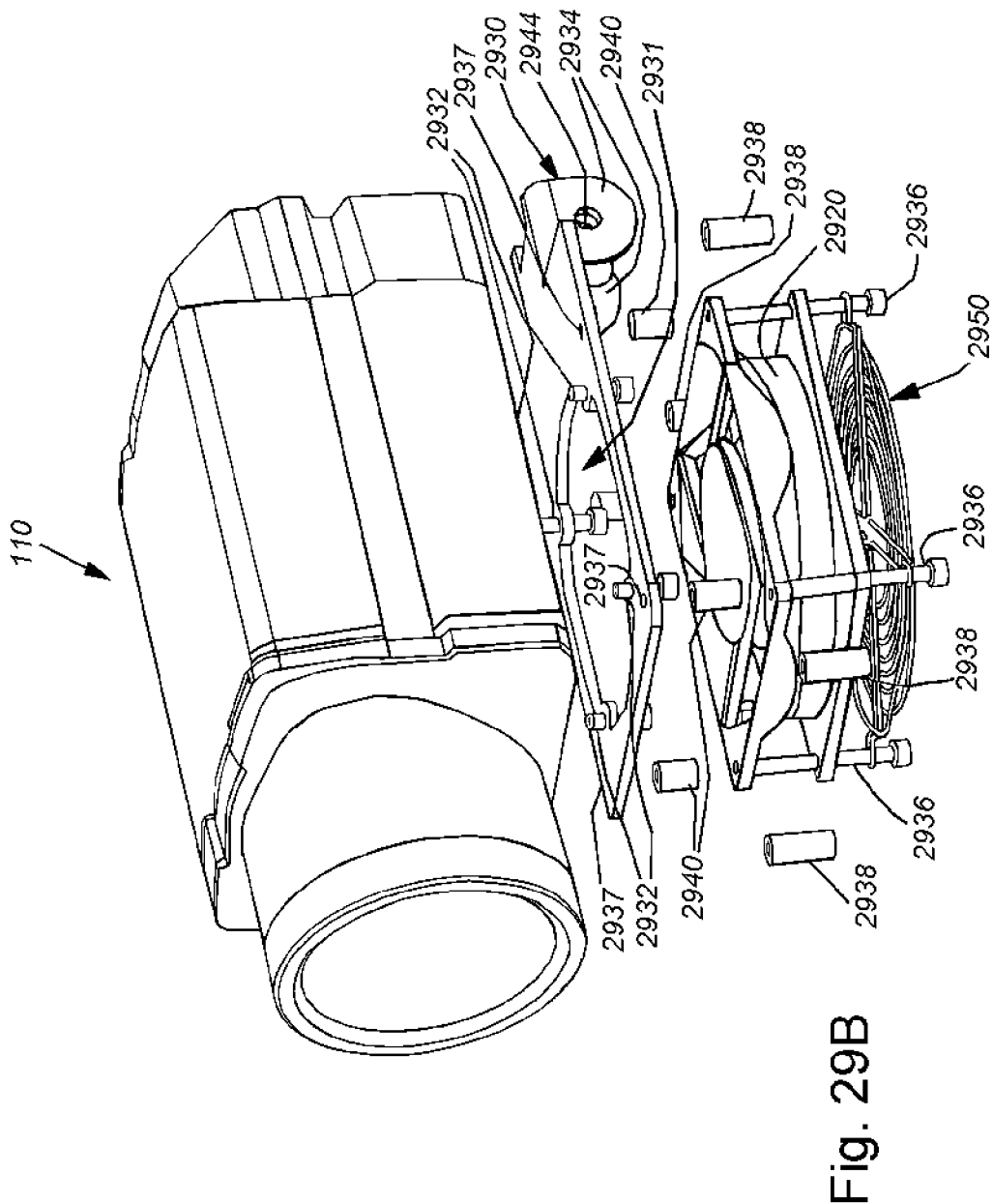
FIG. 29B is an exploded perspective view of the camera assembly with bracket and cooling fan of FIG. 29A.

With further reference to the more detailed perspective views of FIGS. 29A and 29B, the illustrative camera assembly 110 (with exemplary lens 2928) can also include an optional bracket 2930, which provides an intermediate assembly with respect to the fan 2920. The bracket 2930 includes a circular port 2031 that is sized to the diameter of the Fan blades so as to allow for airflow therethrough. The bracket 2930 also includes fasteners 2932 that secure the bracket to the above-described threaded holes (588 in FIG. 5A) in the bottom of the camera body. The fan 2920 is mounted to the exterior face of the bracket 2930 using fasteners 2936 that are offset from the bracket fasteners 2932. These fasteners 2938 seat into threaded holes 2937 in the bracket 2930. The fasteners 2936 pass through spacers 2938 that maintain the rigidity of the fan's mounting flanges. The fasteners 2936 also pass through standoffs 2940 space the fan 2920 from the exterior face of the plate, thereby allowing for exhaust flow from the bottom surface. The spacing can be between approximately 0.5 and 2 centimeters in an embodiment, but a wide range of possible standoff distances is expressly contemplated. Note that is also expressly contemplated that the bracket and/or fan can be mounted on one or more sides (i.e. left or right) and/or on the top side of the camera body in alternate embodiments. This can be dependent in part upon the mounting arrangement of the camera. The fan can be covered by conventional safety grille as part of the fastener arrangement The bracket 2930 also includes a pair of illustrative tabs 2934 with fastener holes 2944 that can be used as part of the mounting arrangement for suspending the camera assembly (and any associated accessories, such as the FOVE over a scene to-be-imaged.

Figure 30:
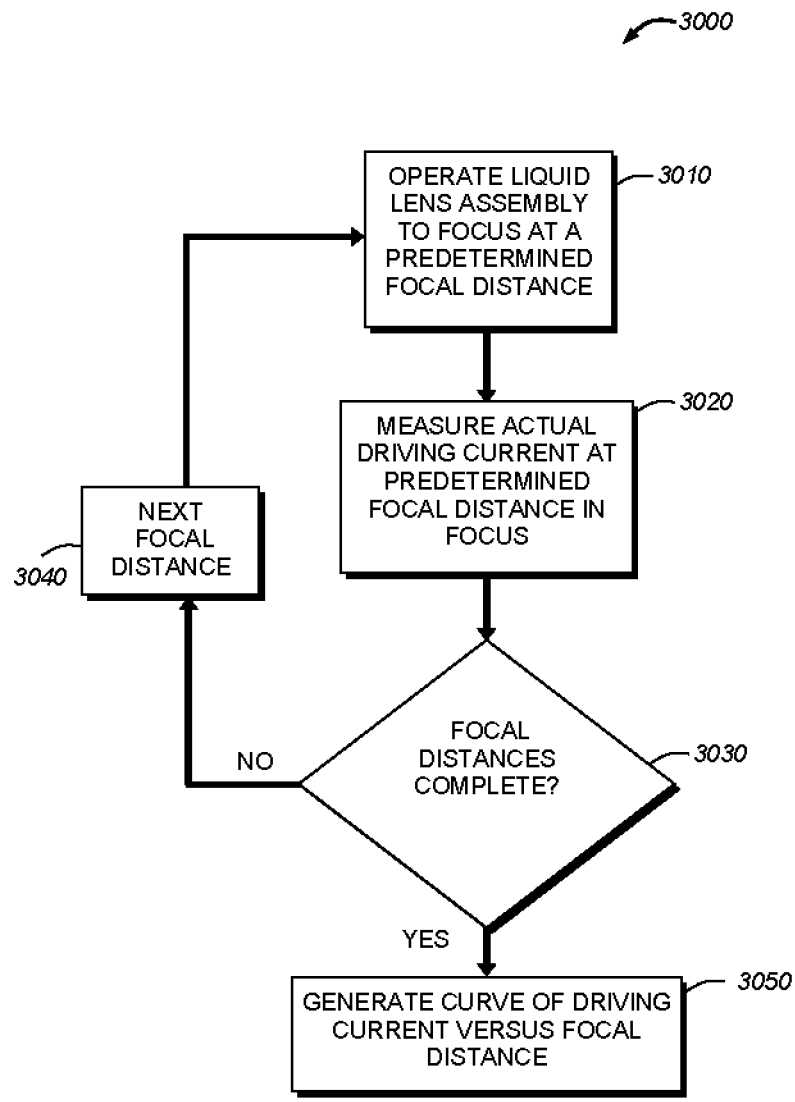
FIG. 30 is a flow diagram showing a system process for correcting for non-linearity in a curve of lens driving current versus focal distance/optical power.

With reference to FIG. 30, accurate operation of the liquid lens assembly (or another variable lens) can be enhanced by providing a curve of driving current versus focal distance (or lens optical power). That is, the operating curve for driving current for a lens assembly is often non-linear over its range of focal distances. The depicted process 3000 accounts for non-linearity. During manufacturing, or at calibration, the lens is driven to focus on objects/fiducials at differing known focal distances (step 3010). The lens is driven to focus on the know-focal-distance object/fiducial. At this focus, the actual driving current is measured (step 3020). The process continues incrementing through a plurality of focal distances (decision step 3030 and step 3040) until all focal distances have been run through the process. The decision step 3030 then branches to step 3050 in which the data points on driving current are used to generate a curve of driving current versus focal distance (or optical power). The curve indicates any non-linearity and this can be stored (for example as a look-up table or modeled equation) so that the lens is subsequently driven during runtime using corrections provided by the curve. It should be clear that the analysis of, and correction for, non-linearity in lens driving current can be made using a wide range of techniques clear to those of skill in the art.

Figure 31:
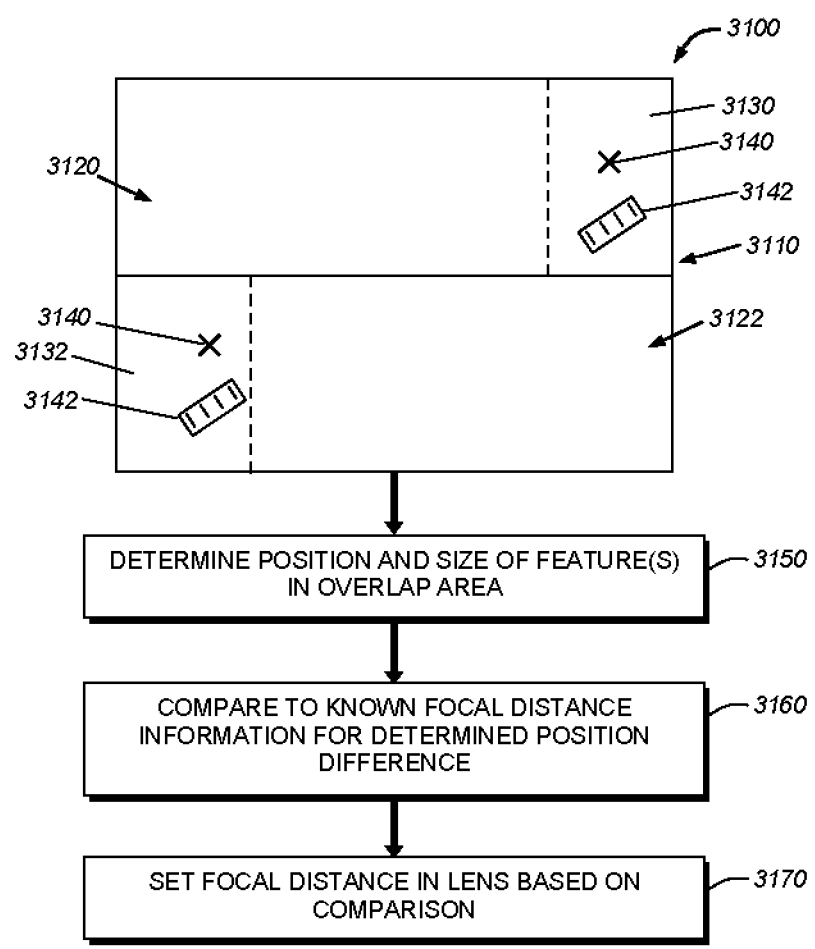
FIG. 31 is a flow diagram showing a system process for determining focal distance based upon analysis of the position of features in each overlap region of an FOVE-projected image.

With reference to FIG. 31, a process 3100 for determining focal distance based upon the overlap region in an FOVE image is shown. The image frame 3110 is divided into two parts 3120 and 3122 corresponding to each side in the FOVE's overall expanded width. Each image part 3120 and 3122 contains an associated overlap region 3130 and 3132 as described above. Within each overlap region 3130, 3132 are one or more discernable features (for example X 3140 and barcode 3142). These features can be any contrasting elements that are visible in both overlap regions. The system identifies the features in each overlap region and determines their relative position and size (step 3150). At different focal distances both of these parameters vary by a known metric. The process 3100 compares the position shift (and size differences, if any) to a known corresponding value for focal distance in step 3160. More generally this process operates in the manner of a coincidence range finder. This value for focal distance is then used to set the focal distance in the lens assembly in step 3170. This process, and other auto-regulation processes described herein, can be carried out by programming on the FPGA or using system task functionality in one or more cores of the processor 114 that provides information back to the FPGA so as to allow the focal adjustment to be carried out by the FPGA.

Figure 32:
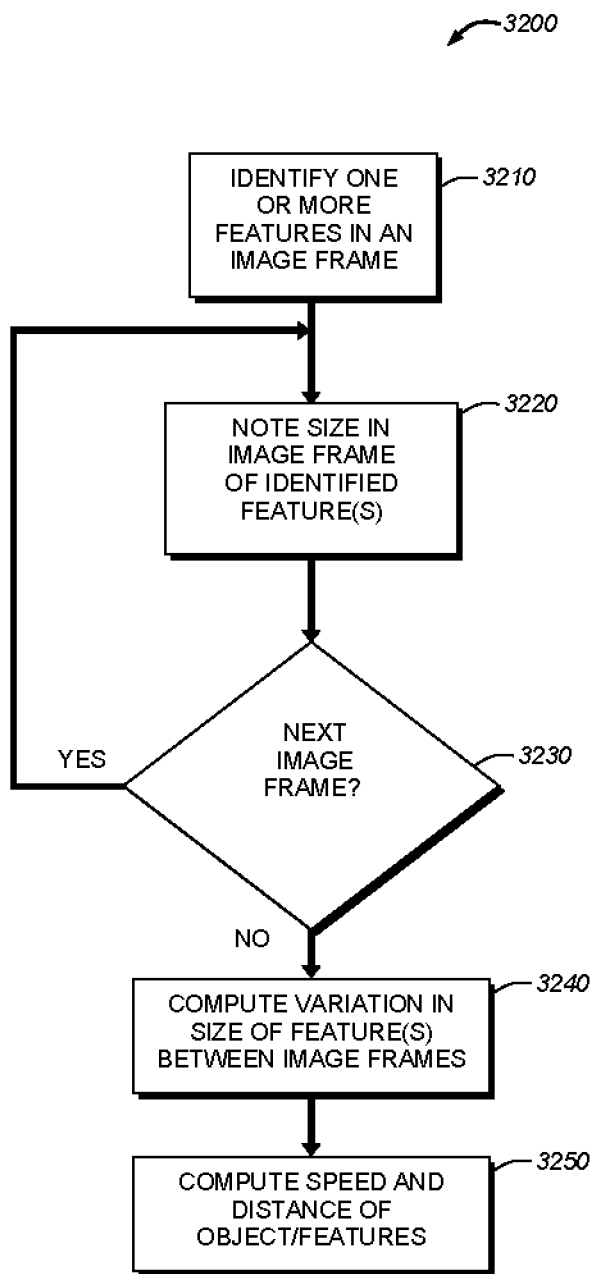
FIG. 32 is a flow diagram of a system process for determining speed and/or distance of an object passing through the field of view of the vision system of FIG. 1 using variation in the size of features of the object between image frames.

Another process 3200 for more generally determining speed and distance of objects passing through the field of view, which can be useful in auto-focus and other auto-regulation processes, is shown in FIG. 32. In this embodiment, the system identifies one or more features in the object—typically some or all of the edges of the object itself or another closed or semi-closed element. The process notes and stores the size of the feature(s) in step 3220. The process then looks for a next image frame with the feature(s) (decision step 3230) and/or has already obtained sufficient frames to make a determination. If a next frame is to be processed, the process loops back to step 3220 and notes/stores the size of the feature(s) in that next frame. This continues until no more frames are available or sufficient frames have been processed. The decision step 3230 then branches to step 3240 where the variation in size between image frames is computed. Then in step 3250, given knowledge of the time base between image frames and with information as to the relative distance in speed for a given variation in size over time (e.g. a curve or a look-up table), the process computes relative distance and speed for the object. This can be used to control focus of the lens assembly.

Figure 33:
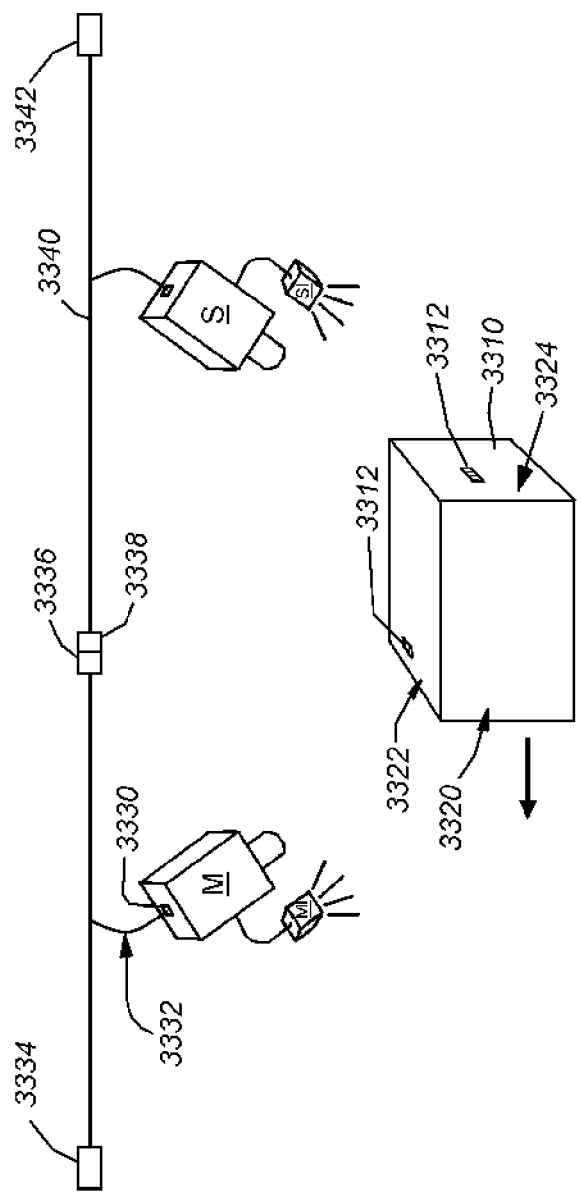
FIG. 33 is a diagram of an exemplary master-slave arrangement showing a plurality of interconnected camera assemblies and illuminators according to an embodiment.

With reference to FIG. 33, an exemplary arrangement of two camera assemblies (with FOVEs omitted) M and S are located on each of opposing sides of a scene so as to image the front and rear sides of an object 3310 having multiple IDs 3312 on differing surfaces, only some of which are in the field of view of each camera, but all of which (i.e. front 3320, top 3322 and rear 3324) are completely imaged by both camera assemblies M and S. Each camera assembly M and S includes a respective illuminator MI and SI. Notably the cameras M and S are arranged, respectively in a master-slave arrangement, in which a rear-mounted RS-485 connector (part of the communication interface provided to the camera assembly and communicating with the processor 114) 3330 on assembly M is connected to a Y-cable 3332. The Y cable includes opposing male and female connectors 3334. One of the connectors (3336) joins an opposing connector 3338 that links to assembly S via a second Y-cable 3340 with a further connector 3342 so as to interconnect additional slave units. In order to avoid cross-talk between illuminators, the processor of assembly M directs image capture and illumination trigger of itself at time TM and image capture/illumination by assembly S at a discrete time TS. Capture times TM and TS are offset by a predetermined time base that ensures the capture of images by each camera assembly is free of interference by the other. Images can be processed by either cores in each camera assembly or both camera assemblies with image data potentially shared between cameras using appropriate connections (e.g. the network connection (270 in FIG. 2). For example, one set of cores can be adapted to find IDs in all images, while the other can be adapted to decode all images. Additional camera assemblies can be connected by appropriate cables and an expanded master-slave (or other control arrangement) can be implemented.

VI. Conclusion

It should be clear that the above described embodiments for a vision system employing a vision system camera with multi-core processor, high-speed, high-resolution imager, FOVE, auto-focus lens and imager-connected pre-processor to pre-process image data provides the acquisition and processing speed, as well as the image resolution that are highly desirable in a wide range of applications. More particularly, this arrangement is highly effective in scanning objects that require a wide field of view, vary in size and the positioning of features of interest and move relatively quickly with respect to the system field of view. This vision system provides a physical package with a wide variety of physical interconnections to support various options and control functions. The package is effective at dissipating internally generated heat by arranging components so as to optimize heat transfer to the ambient environment and includes dissipating structure (e.g. fins) to facilitate such transfer. The system also enables a wide range of multi-core processes to optimize and load-balance both image processing and system operation (i.e. auto-regulation tasks). Also, it is expressly contemplated that the above-described methods and procedures for operating the camera assembly and performing vision system/decoding tasks can be combined in various ways to achieve a desired processing result. Likewise, procedures can be switched depending upon processing conditions (e.g. procedure 2100 can be used and then switched to procedure 2300 under circumstances, etc.). Likewise, given a multiplicity of cores (greater than two) multiple procedures can be performed concurrently (e.g. procedure 2500 is performed in two of four cores and procedure 2600 is concurrently performed in the other two of four cores).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Also, while not depicted, it is expressly contemplated that a variety of mounting arrangements, supported from a variety of structures (e.g. an overhead boom, a ceiling post, a beam, etc.) can be used to secure the camera assembly and other vision system components as appropriate with respect to the imaged scene. Likewise, while the FOVE is shown as a dual-field expander, it is expressly contemplated that the FOVE can expand the field to three or more fields, each appropriately projected as a partial image on the imager. Also, while the expansion by the FOVE is carried out along a "width" dimension as described, it is expressly contemplated that the term "width" can be substituted for "height" herein, where such an application is desired. Thus, expansion can occur along one of either the width and the height. Likewise, it is expressly contemplated that internal or external illumination can include projected visible and/or non-visible (e.g. near-IR) wavelengths adapted for specific functions, such as calibration and the imager can be adapted to read such wavelengths exclusively during specific tasks, such as calibration. Moreover, while the FPGA and processor herein are each shown performing certain functions, it is expressly contemplated that some functions can be switched to either of these structures. In alternate embodiments, a majority of tasks and functions can be performed with the multi-core processor and the hardware/firmware-based functions performed by the depicted FPGA can be minimal, or the FPGA can be omitted entirely, in favor of a different circuit that is adapted for transmitting image data from the image sensor to the processor in an appropriate format at an appropriate time. Accordingly, this description is meant to be taken only by way of example, and not to otherwise limit the scope of this invention.

What is claimed is:

1. A vision system comprising:
 a camera including an imager and processor arrangement, the processor arrangement including,
 (a) a pre-processor interconnected to the imager that receives, at a first frame rate, and pre-processes images of an object having a symbology code from the imager, and
 (b) a multi-core processor that receives pre-processed images from the pre-processor, dynamically assigns one or more vision system tasks and one or more system operation tasks to be performed by one or more respective cores of the multi-core processor, and performs the one or more system operation tasks and performs the one or more vision system tasks on at least one of the images to generate results relative to information in the images.

2. A method comprising,
 capturing one or more image frames of an object having a symbology code;

transmitting the one or more image frames from a preprocessor to the multi-core processor;

dynamically assigning, by a scheduler, one or more vision system tasks to be performed on the image frames by one or more respective cores of the multi-core processor;

dynamically assigning, by the scheduler, one or more system operation tasks to be performed by one or more respective cores of the multi-core processor;

performing the one or more vision system tasks on the image frames by the one or more respective cores of the multi-core processor; and performing the one or more system operation tasks by the one or more respective cores of the multi-core processor.

3. The method of claim 2, wherein dynamic assigning is based upon an advance estimate of when the one or more respective cores will be available to perform the one or more tasks.

4. The method of claim 2, wherein the image frames are divided into two image parts.

5. The method of claim 4, wherein the image frames divided into two image parts are divided vertically or horizontally.

6. The method of claim 5, wherein performing the one or more vision system tasks comprises:

decoding a first part of the two image parts by a first core of the one or more respective cores and generating a first decoded result; and decoding a second part of the two image parts by a second core of the one or more respective cores and generating a second decoded result.

7. The method of claim 6, further comprising:

combining the first decoded result and the second decoded result into a combined decoded result; and providing the combined decoded result to a downstream process.

8. The method of claim 7, wherein the downstream process comprises one or more of: an indication of a good ID read or a no ID read; or transmission of the combined decoded result to a remote computer.

9. The method of claim 4, wherein the two image parts at least partially overlap.

10. The method of claim 2, wherein the symbology code comprises a one or more of a 1D code or a 2D code.

11. The method of claim 2, wherein the one or more vision system tasks comprises one or more of ID decoding or ID finding.

12. The method of claim 2, wherein performing the one or more vision system tasks comprises:

decoding, with a first core of the one or more respective cores, a first image of the one or more images using a first decoding algorithm; and decoding, with a second core of the one or more respective cores, the first image of the one or more images using a second decoding algorithm that is distinct from the first decoding algorithm.

13. The method of claim 2, wherein dynamically assigning comprises assigning a first core of the one or more respective cores to decode an image frame of the one or more image frames within a predetermined maximum time.

14. The method of claim 2, wherein a first core of the one or more respective cores exclusively performs ID finding tasks and a second core of the one or more respective cores exclusively performs ID decoding tasks.

15. The method of claim 14, wherein an ID finding result is transmitted from the first core to the second core.

16. The method of claim 2, further comprising:

monitoring the image frames transmitted from the preprocessor to the multi-core processor.

17. The method of claim 2, wherein the one or more system operation tasks comprise at least one of: illumination control, brightness exposure or focusing of an auto-focus lens.

* * * * *